US010953938B2

(12) United States Patent
Georgeson et al.

(10) Patent No.: US 10,953,938 B2
(45) Date of Patent: Mar. 23, 2021

(54) APPARATUS AND METHODS FOR MAINTENANCE OF WIND TURBINE BLADES

(71) Applicant: The Boeing Company, Chicago, IL (US)

(72) Inventors: Gary E. Georgeson, Tacoma, WA (US); Joseph L. Hafenrichter, Auburn, WA (US)

(73) Assignee: The Boeing Company, Chicago, IL (US)

( * ) Notice: Subject to any disclaimer, the term of this patent is extended or adjusted under 35 U.S.C. 154(b) by 236 days.

(21) Appl. No.: 15/922,822

(22) Filed: Mar. 15, 2018

(65) Prior Publication Data
US 2019/0283821 A1  Sep. 19, 2019

(51) Int. Cl.
*B62D 57/024*   (2006.01)
*F03D 17/00*    (2016.01)
(Continued)

(52) U.S. Cl.
CPC .......... *B62D 57/024* (2013.01); *B60B 19/003* (2013.01); *F03D 17/00* (2016.05);
(Continued)

(58) Field of Classification Search
CPC ....... B62D 57/024; F03D 17/00; F03D 80/55; F03D 80/50; B60B 19/003; F05B 2260/80; B08B 9/023
(Continued)

(56) References Cited

U.S. PATENT DOCUMENTS 3,789,947 A   2/1974  Blumrich
4,146,967 A   4/1979  Rohner et al.
(Continued)

FOREIGN PATENT DOCUMENTS

EP     463709    *  6/1992
EP     2759824 A1    7/2014
(Continued)

OTHER PUBLICATIONS

Extended European Search Report dated Aug. 7, 2019 in European Patent Application No 19162263.8 (European counterpart to the instant U.S. patent application).
(Continued)

*Primary Examiner* — Robert R Raevis
(74) *Attorney, Agent, or Firm* — Ostrager Chong Flaherty & Broitman P.C.

(57) ABSTRACT

Apparatus and methods for the automated non-destructive inspection of wind turbine blades. In one embodiment, the automated apparatus includes: a cart comprising a cart frame, a multiplicity of wheels, and a cart motor for driving rotation of at least one wheel; a multiplicity of cables depending from the cart; a multiplicity of crawler vehicles respectively attached to the multiplicity of cables, each crawler vehicle comprising a crawler vehicle frame and a set of wheels; and a multiplicity of maintenance tools respectively coupled to the crawler vehicle frames of the multiplicity of crawler vehicles. The crawler vehicles are equipped with suction devices to enable adherence to the surface and may be configured for holonomic motion during such adherence.

20 Claims, 16 Drawing Sheets

(51) Int. Cl.
  *F03D 80/55* (2016.01)
  *B60B 19/00* (2006.01)
  *F03D 80/50* (2016.01)

(52) U.S. Cl.
  CPC ............ *F03D 80/50* (2016.05); *F03D 80/55* (2016.05); *F05B 2260/80* (2013.01)

(58) Field of Classification Search
  USPC ..................... 73/865.8, 618–622, 637, 638; 324/228–230, 237, 238, 240–243; 416/61
  See application file for complete search history.

(56) References Cited

U.S. PATENT DOCUMENTS

| | | | |
|---|---|---|---|
| 5,031,458 A | | 7/1991 | Young et al. |
| 5,240,503 A | * | 8/1993 | Levy .................. A47L 1/02 118/323 |
| 5,623,107 A | | 4/1997 | Patterson, Sr. et al. |
| 5,698,787 A | | 12/1997 | Parzuchowski et al. |
| 6,167,760 B1 | | 1/2001 | Brunty et al. |
| 6,220,099 B1 | | 4/2001 | Marti et al. |
| 6,378,387 B1 | | 4/2002 | Froom |
| 6,829,959 B2 | | 12/2004 | Gifford et al. |
| 7,083,383 B2 | | 8/2006 | Loftus et al. |
| 7,231,826 B2 | | 6/2007 | Bossi et al. |
| 7,240,556 B2 | | 7/2007 | Georgeson et al. |
| 7,315,609 B2 | | 1/2008 | Safai et al. |
| 7,337,673 B2 | | 3/2008 | Kennedy et al. |
| 7,562,593 B2 | | 7/2009 | Engelbart et al. |
| 7,626,383 B1 | | 12/2009 | Sun et al. |
| 7,640,811 B2 | | 1/2010 | Kennedy et al. |
| 7,643,893 B2 | | 1/2010 | Troy et al. |
| 7,716,989 B2 | | 5/2010 | Kollgaard |
| 8,060,270 B2 | | 11/2011 | Vian et al. |
| 8,199,194 B2 | | 6/2012 | Troy et al. |
| 8,347,746 B2 | | 1/2013 | Hafenrichter et al. |
| 8,483,356 B2 | | 7/2013 | Bendahan |
| 8,544,484 B2 | | 10/2013 | Jensen et al. |
| 8,738,226 B2 | | 5/2014 | Troy et al. |
| 8,743,196 B2 | | 6/2014 | Fritz et al. |
| 8,807,257 B1 | | 8/2014 | Hansen et al. |
| 8,874,371 B2 | | 10/2014 | Troy et al. |
| 8,892,252 B1 | | 11/2014 | Troy et al. |
| 9,156,321 B2 | | 10/2015 | Troy et al. |
| 9,302,787 B2 | | 4/2016 | Hafenrichter et al. |
| 9,481,082 B1 | | 11/2016 | Hafenrichter et al. |
| 9,574,549 B2 | | 2/2017 | Lee et al. |
| 9,643,313 B2 | | 5/2017 | Hafenrichter et al. |
| 9,689,170 B1 | * | 6/2017 | Lange .................. E04G 23/002 |
| 2002/0036108 A1 | | 3/2002 | Jeswine et al. |
| 2003/0147493 A1 | | 8/2003 | Bueno et al. |
| 2006/0043303 A1 | | 3/2006 | Safai et al. |
| 2006/0055396 A1 | | 3/2006 | Georgeson et al. |
| 2007/0096727 A1 | | 5/2007 | Rempt et al. |
| 2009/0038398 A1 | | 2/2009 | Lavoie et al. |
| 2010/0011864 A1 | | 1/2010 | Hanan et al. |
| 2010/0132137 A1 | | 6/2010 | Eggleston et al. |
| 2011/0178727 A1 | | 7/2011 | Hafenrichter et al. |
| 2012/0060611 A1 | | 3/2012 | Thommen-Stamenkov et al. |
| 2012/0153032 A1 | | 6/2012 | Svanebjerg et al. |
| 2013/0024067 A1 | * | 1/2013 | Troy .................. B25J 5/007 701/36 |
| 2013/0261876 A1 | | 10/2013 | Froom et al. |
| 2013/0289766 A1 | | 10/2013 | Hafenrichter et al. |
| 2013/0298682 A1 | | 11/2013 | Motzer et al. |
| 2013/0304251 A1 | | 11/2013 | Garvey et al. |
| 2015/0013545 A1 | | 5/2015 | Lee et al. |
| 2015/0026768 A1 | | 9/2015 | Krampe |

FOREIGN PATENT DOCUMENTS

| | | | |
|---|---|---|---|
| JP | 408201354 | * | 8/1996 |
| WO | 117698 | * | 3/2001 |
| WO | 2011107087 A2 | | 9/2011 |
| WO | 2017110743 A1 | | 6/2017 |

OTHER PUBLICATIONS

European Examination Report dated Dec. 4, 2020 in European Patent Application No. 19162263.8 (European counterpart to the instant U.S. patent application).

* cited by examiner

APPARATUS AND METHODS FOR MAINTENANCE OF WIND TURBINE BLADES

BACKGROUND

This disclosure generally relates to automated systems for carrying maintenance tools across surfaces, such maintenance tools including (but not limited to) sensors used in non-destructive inspection (NDI). In particular, this disclosure relates to tool-carrying crawler vehicles that are capable of operating on a non-level surface.

A typical wind turbine has a multiplicity of blades extending radially outward from a central hub, to which the roots of the blades are attached. Wind turbine blades are typically made of laminated fiber-reinforced plastic material and designed so that wind energy is converted into rotational motion efficiently. Blade efficiency is generally dependent upon blade shape and surface smoothness. However, during operation the wind turbine blades may be exposed to debris that has the potential to reduce wind turbine efficiency or may be subjected to damage that has the potential to adversely affect structural integrity. Thus, it is common practice to visually inspect the exterior of each blade to identify potential structural anomalies or perform some other maintenance operation on the exterior, such as cleaning.

It is known to manually inspect and clean wind turbine blades by hoisting a person to a position adjacent to each blade via suspension from the tower, the hub, or a proximately located crane. However, manual blade inspection and cleaning can be time-consuming and difficult operations. To mitigate the drawbacks of manual inspection and cleaning, various solutions involving an apparatus configured to travel in a spanwise direction along the length of a wind turbine blade have been proposed. However, there is ample scope for improvements in the state of this art.

SUMMARY

The subject matter disclosed herein is directed to an automated apparatus for performing maintenance functions on wind turbine blades or other structures (such as aircraft fuselages and wings). As used herein, the term "maintenance" includes, but is not limited to, operations such as non-destructive inspection, drilling, scarfing, grinding (e.g., to remove bonded or bolted components), fastening, applique application, ply mapping, cleaning, marking and painting.

In accordance with various embodiments, the automated apparatus comprises a wheeled cart having a multiplicity of maintenance tool-carrying wheeled crawler vehicles suspended therefrom by respective cables. In the case of a generally horizontally extending wind turbine blade, the cart travels along the leading edge of the wind turbine blade while the crawler vehicles hang on both sides of the wind turbine blade with their wheels in contact with the respective side surfaces. In the case where the maintenance operation is non-destructive inspection, one set of crawler vehicles scans one side surface of the wind turbine blade, while another set of crawler vehicles scans the other side surface of the wind turbine blade. The cable lengths may be adjusted to change the elevations of the crawler vehicles to ensure full coverage of the wind turbine blade surfaces during scanning.

In accordance with some embodiments, the crawler vehicles are configured to be capable of holonomic motion. A holonomic-motion system is one that is not subject to motion constraints. As used in this disclosure, a vehicle is considered to be holonomic if the controllable degrees of freedom are equal to the total degrees of freedom. This type of system can translate in any direction while simultaneously rotating. This is different than most types of ground vehicles, such as car-like vehicles, tracked vehicles, or wheeled differential-steer (skid-steer) vehicles, which cannot translate in any direction while rotating at the same time.

The maintenance tool carried by the crawler vehicle may be selected from a group of interchangeable maintenance tools, including NDI sensors of different types (e.g., an ultrasonic transducer array, an infrared thermography unit, a video camera, an optical three-dimensional coordinate measuring machine or a laser line scanner), a cleaning unit, and so forth. In accordance with one implementation, the automated apparatus comprises a multiplicity of crawler vehicles capable of supporting any one of a plurality of maintenance tools for performing a set of maintenance functions on a wind turbine blade. As a whole, the automated apparatus disclosed herein reduces maintenance time, labor hours and human errors and increases safety when robotic maintenance functions are performed on wind turbine blades.

Although various embodiments of an automated apparatus and automated methods for performing maintenance operations on a wind turbine blade or other structure are described in some detail later herein, one or more of those embodiments may be characterized by one or more of the following aspects.

One aspect of the subject matter disclosed in detail below is an automated apparatus comprising: a cart comprising a cart frame, a multiplicity of wheels rotatably coupled to the cart frame, and a cart motor for driving rotation of a wheel of the multiplicity of wheels; a multiplicity of cables depending from the cart; a multiplicity of crawler vehicles (e.g., holonomic-motion crawler vehicles) respectively attached to the multiplicity of cables, each crawler vehicle comprising a crawler vehicle frame and a set of wheels rotatably coupled to the crawler vehicle frame; and a multiplicity of maintenance tools respectively coupled to the crawler vehicle frames of the multiplicity of crawler vehicles.

In accordance with the disclosed embodiments, the automated apparatus further comprises a multiplicity of cable spools to which the multiplicity of cables are respectively attached. In accordance with one embodiment, the multiplicity of cable spools may be rotatably coupled to the cart frame. In accordance with another embodiment, the automated apparatus further comprises a multiplicity of turrets respectively mounted to the crawler vehicle frames of the multiplicity of crawler vehicles and having respective rotatable portions, in which case the multiplicity of cable spools are respectively rotatably coupled to the respective rotatable portions of the multiplicity of turrets for enabling the multiplicity of cables to respectively twist during rotation of the respective rotatable portions of the multiplicity of turrets. Optionally, the automated apparatus further comprises a multiplicity of tensioning springs configured for respectively urging the multiplicity of cable spools to rotate in a direction that causes respective winding of the multiplicity of cables on the multiplicity of cable spools.

Another aspect of the subject matter disclosed in detail below is a crawler vehicle comprising: a crawler vehicle frame; a set of wheels rotatably coupled to the crawler vehicle frame; a maintenance tool coupled to the crawler vehicle frame; a turret mounted to the crawler vehicle frame and having a rotatable portion; and a cable spool rotatably coupled to the rotatable portion of the turret. In accordance with one embodiment, the crawler vehicle further comprises a counter-reel rotatably coupled to the rotatable portion of the turret and configured to compensate for cord twisting during rotation of the cable spool. In accordance with some embodiments, the wheels of the crawler vehicle are configured to be capable of holonomic motion.

A further aspect of the subject matter disclosed in detail below is a method for performing a maintenance operation on an elongated body (e.g., a wind turbine blade) having first and second side surfaces connected by a curved surface, the method comprising: (a) suspending first and second crawler vehicles from a cart using one or more cables; (b) placing the cart in contact with the curved surface of the elongated body at a position with the first and second crawler vehicles in contact with the first side surface; (c) adhering the first and second crawler vehicles to the first side surface using suction; (d) moving the first and second crawler vehicles relative to the first side surface along first and second scan paths respectively while the first and second crawler vehicles are adhered to the first side surface; and (e) operating the first and second maintenance tools to perform maintenance operations on the first side surface along the first and second scan paths respectively while the first and second crawler vehicles are adhered to the first side surface. In cases where the first and second maintenance tools are non-destructive inspection sensors that respectively acquire first and second non-destructive inspection sensor data along the first and second scan paths during step (d), the method further comprises stitching the first and second non-destructive inspection sensor data together.

In accordance with some embodiments of the method described in the preceding paragraph, the cart moves while the first and second crawler vehicles are moving. In accordance with other embodiments, the cart is stationary while the first and second crawler vehicles are moving. The disclosed method may be specifically adapted for performing maintenance operations on wind turbine blades. Multiple crawler vehicles may be attached to the same cable.

Yet another aspect of the subject matter disclosed in detail below is an automated system for performing a maintenance operation, comprising: a cart comprising a cart frame, a multiplicity of wheels rotatably coupled to the cart frame, and a cart motor for driving rotation of a wheel of the multiplicity of wheels; a multiplicity of cables depending from the cart; a multiplicity of cable spools to which the multiplicity of cables are respectively attached; a multiplicity of holonomic-motion crawler vehicles respectively attached to the multiplicity of cables, each holonomic-motion crawler vehicle comprising a crawler vehicle frame, a set of wheels rotatably coupled to the crawler vehicle frame, and a set of wheel motors configured to respectively drive rotation of the wheels of the set of wheels; a multiplicity of maintenance tools respectively coupled to the crawler vehicle frames of the multiplicity of crawler vehicles; and a computer system configured to control operation of the cart motor, wheel motors and maintenance tools to perform coordinated maintenance operations in respective areas of a surface over which the multiplicity of holonomic-motion crawler vehicles respectively travel.

In accordance with some embodiments, each crawler vehicle may be connected to the cart by a respective pair of cables. In accordance with other embodiments, each cable may be connected to two or more crawler vehicles positioned along the cable at different elevations.

Other aspects of an automated apparatus and automated methods for performing maintenance operations on a wind turbine blade or other structure are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, systems and methods for performing automated maintenance operations on a wind turbine blade will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A typical wind turbine has a multiplicity of blades extending radially outward from a central hub, to which the roots of the blades are attached. The hub is rotatably coupled to a nacelle that is supported at a height above ground by a tower. The blades are configured to generate aerodynamic forces that cause the wind turbine to rotate in response to wind impinging on the blade surfaces. The nacelle houses an electric generator which is operatively coupled to the hub. The electric generator is configured to generate electrical power as the hub rotates.

As used herein, the term "wind turbine blade" refers to an airfoil-shaped body having a leading edge and a trailing edge connected by upper and lower surfaces that extend from a root to a tip of the blade. The cross-sectional profile of the blade may change in size and shape from the root to the tip.

Figure 1:
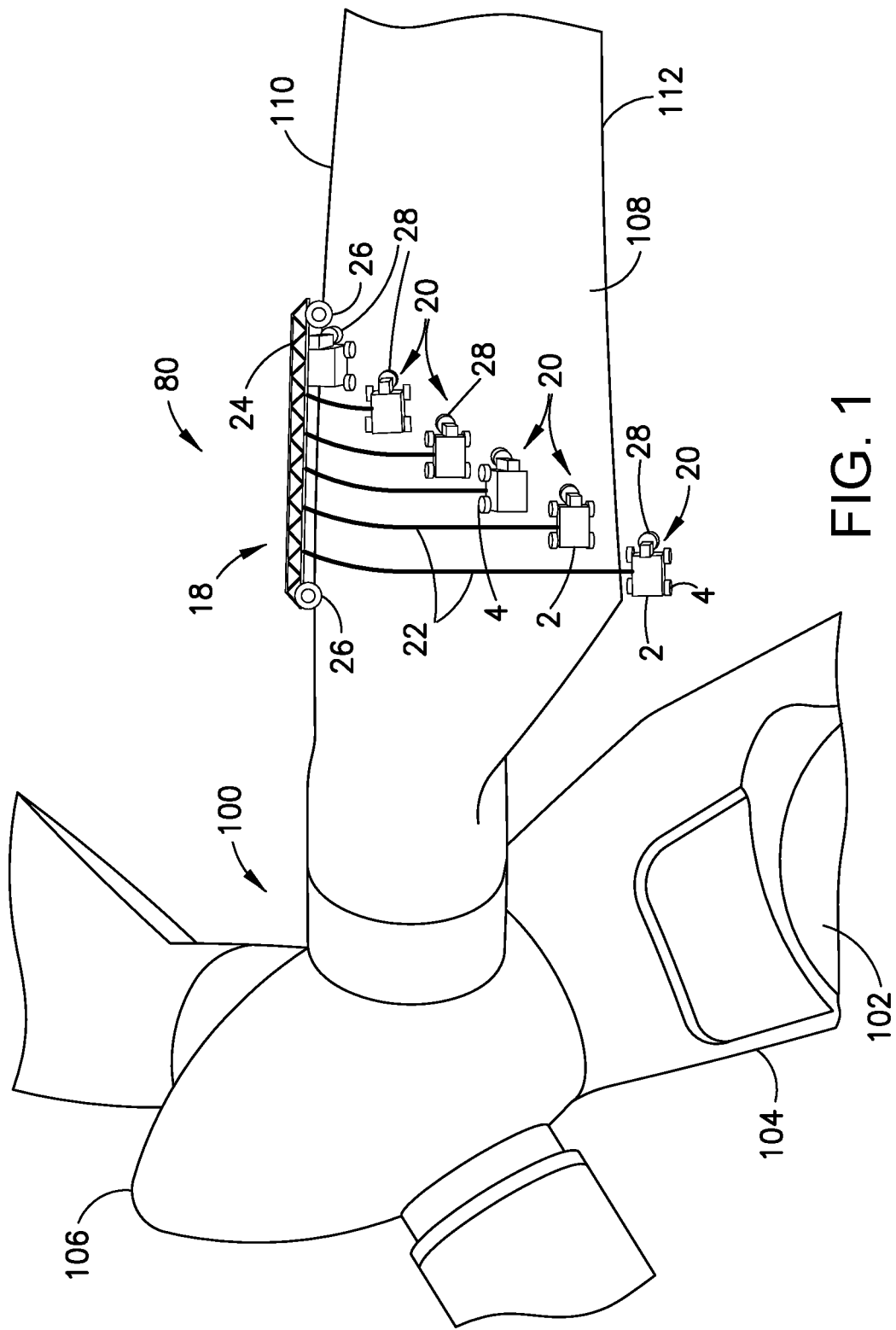
FIG. 1 is a diagram representing a view of a portion of a wind turbine having an automated apparatus mounted on a wind turbine blade 108 for performing a maintenance operation in accordance with one embodiment.

A blade maintenance tool is a device that performs a maintenance operation, such as non-destructive inspection of a wind turbine blade, or cleaning of an external surface of the wind turbine blade, while travelling along the blade. When the maintenance operation is performed, the blade is maintained in an angular position such that its leading edge is approximately horizontal, and a pitch of the blade is adjusted so that the leading edge faces upward, and then, the blade maintenance tool is positioned on the leading edge of the blade. In the alternative, the blade may be maintained in an angular position such that its trailing edge is approximately horizontally, and a pitch of the blade is adjusted so that the trailing edge faces upward, and then, the blade maintenance tool is positioned on the trailing edge FIG. 1 is a diagram representing a view of a portion of a wind turbine 100 having an automated apparatus 80 mounted on a wind turbine blade 108 for performing a maintenance operation in accordance with one embodiment. As partly illustrated in FIG. 1, the wind turbine 100 includes a tower 102, a nacelle 104 installed at a top end of the tower 102, a hub 106 that is rotatably mounted inside the nacelle 104, and a plurality of blades 108 extending radially from the hub 106. The blades 108 are caused to rotate by the forces exerted by wind, thereby rotating the hub 106 which is coupled to an electricity generator (not shown).

Figure 2:
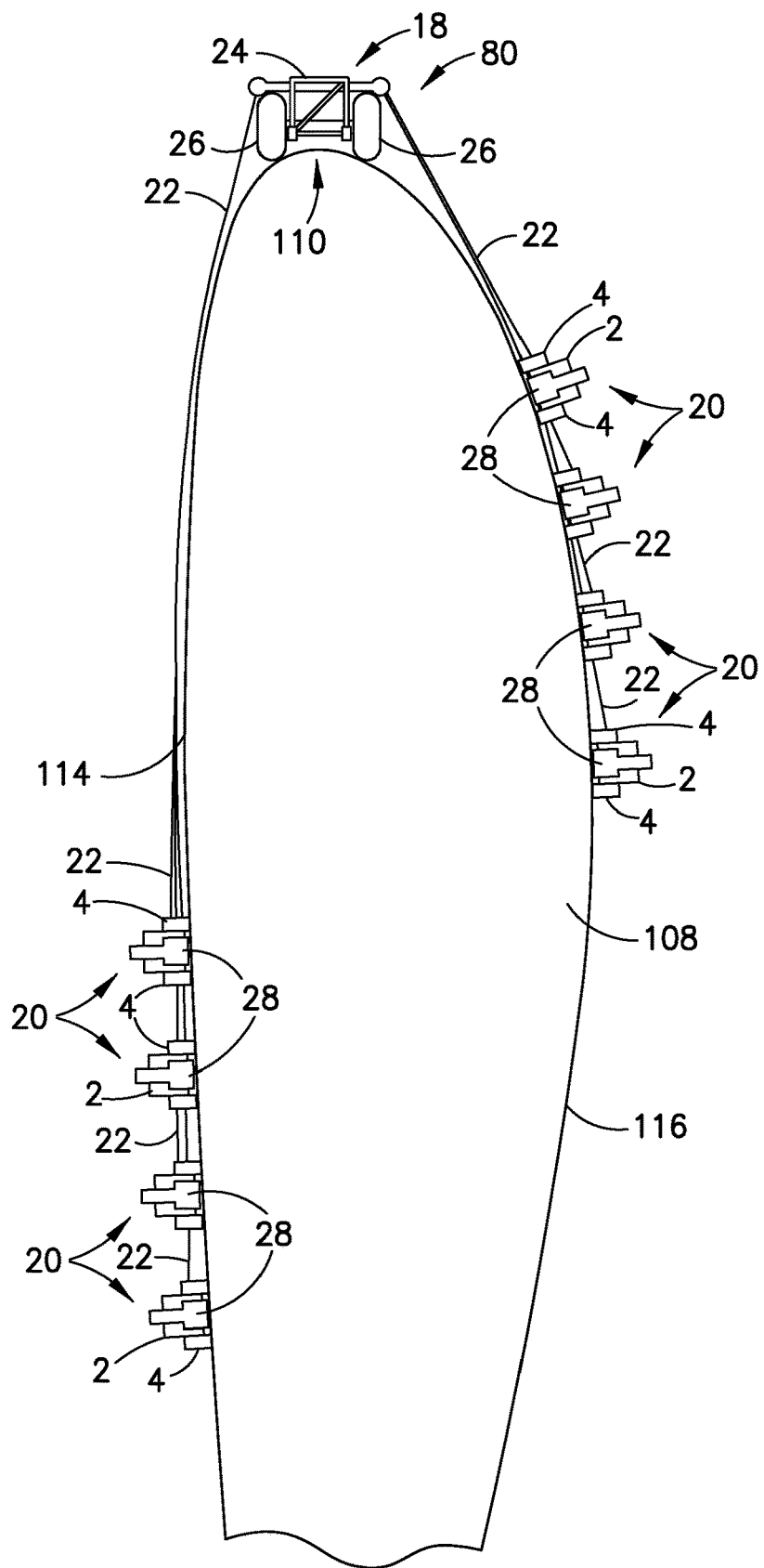
FIG. 2 is a diagram representing an end view of the wind turbine blade with automated apparatus placed thereon depicted in FIG. 1.

FIG. 2 is a diagram representing an end (i.e. chordwise) view of the wind turbine blade 108 with automated apparatus 80 placed thereon as depicted in FIG. 1. The wind turbine blade 108 includes a leading edge 110 and a trailing edge 112. As seen in FIG. 2, the automated apparatus 80 includes a cart 18 that is seated on and may travel along the leading edge 110 of the wind turbine blade 108. In accordance with the particular embodiment depicted in FIGS. 1 and 2, the cart comprises a cart frame 24, a multiplicity of wheels 26 rotatably coupled to the cart frame 24, and a cart wheel motor 62 (see FIG. 4) for driving rotation of a wheel of the multiplicity of wheels 26. The axes of rotation of the wheels 26 may be perpendicular to the leading edge 110 to facilitate cart travel along the leading edge 110. The wheels 26 of the cart 18 may be made of a material having a high frictional force, such as rubber, so that wheels 26 are disinclined to slide off of the surface of the leading edge 110.

Still referring to FIG. 2, the wind turbine blade 108 further includes two side surfaces 114 and 116 which are connected by the leading edge 110. When the wind turbine 100 operates, foreign matter or debris may become attached to the surfaces 114 and 116 of the wind turbine blades 108. Also cracks or scratches may occur in the wind turbine blades 108 during usage. Foreign matter on the surface of the wind turbine blades 108 may degrade the efficiency of the wind turbine 100; cracks may propagate if not attended to. Periodic maintenance may be performed for removing foreign matter from the surfaces of the wind turbine blades 108 or for detecting anomalies (e.g., cracks) in the wind turbine blades 108.

The automated apparatus 80 further includes a multiplicity of cables 22 depending from the cart 18 and a multiplicity of crawler vehicles 20 (e.g., holonomic-motion crawler vehicles) respectively attached to the multiplicity of cables 22. Each crawler vehicle 20 comprises a crawler vehicle frame 2, a set of wheels 4 rotatably coupled to the crawler vehicle frame 2, and a maintenance tool 28 mounted to the crawler vehicle frame 2. One subset of the multiplicity of crawler vehicles 20 are connected to cables 22 in positions whereat maintenance operations may be performed on the side surface 114 of the wind turbine blade 108; another subset of the multiplicity of crawler vehicles 20 are connected to cables 22 in positions whereat maintenance operations may be performed on the side surface 116 of the wind turbine blade. In addition, each crawler vehicle 20 is adhered to a surface of the wind turbine blade 108 by one or more suction devices (described in detail below).

As best seen in FIG. 1, the crawler vehicles 20 may be positioned at different elevations. In accordance with the embodiment depicted in FIGS. 1 and 2, each crawler vehicle 20 is connected to the cart 18 by a single cable 22 which acts as a tether that prevents the crawler vehicle 20 from falling in the event that the suction devices cease to operate or produce insufficient suction force. In accordance with an alternative embodiment partly depicted in FIG. 3 (only one of a multiplicity of crawler vehicles is shown), each crawler vehicle 20 is connected to the cart 18 by a pair of cables 22a and 22b. In accordance with another alternative embodiment partly depicted in FIG. 12 (to be described in some detail below), multiple crawler vehicles 20, 20' and 20" may be attached to the same cable 22. In all of these embodiments, the multiplicity of maintenance tools 28 on the swarm of crawler vehicles 20 scan respective areas on a surface concurrently.

At the start of a maintenance operation, the crawler vehicles 20 may be lowered to respective positions having different elevations, as depicted in FIG. 1. As will be described in more detail later with reference to FIGS. 7 and 8, each crawler vehicle 20 further comprises one or more suction zones that enable the crawler vehicles 20 to adhere to the side surfaces 114 and 116 of the wind turbine blades 108. Maintenance operations may be performed while the crawler vehicles 20 are adhered to the side surfaces 114 and 116 of the wind turbine blades 108. During such maintenance operations, the cart 18 may be either stationary (for example, if the crawler vehicles are holonomic-motion crawler vehicles) or moving (for example, if the crawler vehicles are non-holonomic-motion crawler vehicles).

For one example, in accordance with one possible scanning pattern: (a) while the cart 18 is stopped, a multiplicity of crawler vehicles 20 may be respectively suspended at a first set of elevations (i.e., distances from the cart 18); (b) while the crawler vehicles 20 are so suspended, the cart 18 is moved from a first spanwise position along the leading edge 110 of the wind turbine blade 108 to a second spanwise position; (c) while the cart 18 is moving from the first spanwise position to the second spanwise position, the crawler vehicles 20 suspended at the first set of elevations perform respective maintenance operations along respective scan paths; (d) then the cart 18 is stopped and the multiplicity of crawler vehicles are respectively raised or lowered (e.g., by unwinding or winding of the cables 22 in the case of non-holonomic-motion crawler vehicles or by holonomic motion in the case of holonomic-motion crawler vehicles) to a second set of elevations different than the first set of elevations; and (e) while the cart 18 is moving from the second spanwise position to the first spanwise position, the crawler vehicles 20 suspended at the second set of elevations perform respective maintenance operations along respective scan paths.

For another example, in accordance with another possible scanning pattern: (a) while the cart 18 is stopped at a first spanwise position, a multiplicity of crawler vehicles 20 may be respectively lowered (e.g., by unwinding of the cables 22 in the case of non-holonomic-motion crawler vehicles or by holonomic motion in the case of holonomic-motion crawler vehicles) from a first elevation to a second elevation; (b) while the crawler vehicles are moving from the first elevation to the second elevation, the crawler vehicles 20 perform respective maintenance operations along respective scan paths; (c) while the crawler vehicles are stopped, the cart 18 is moved incrementally to a second spanwise position and then stopped; (d) while the cart 18 is stopped at the second spanwise position, the crawler vehicles 20 may be respectively raised (e.g., by winding of the cables 22 in the case of non-holonomic-motion crawler vehicles or by holonomic motion in the case of holonomic-motion crawler vehicles) from the second elevation to the first elevation; and (e) while the crawler vehicles are moving from the second elevation to the first elevation, the crawler vehicles 20 perform respective maintenance operations along respective scan paths.

In accordance with alternative scanning patterns, the cart 18 and the crawler vehicles 20 may move concurrently. For example, while the cart 18 moves in a spanwise direction along the leading edge 110 of the wind turbine blade 108, the crawler vehicles 20 may alternatingly move up and down in the elevation direction (e.g., by winding and unwinding of the cables 22 in the case of non-holonomic-motion crawler vehicles or by holonomic motion in the case of holonomic-motion crawler vehicles).

Figure 3:
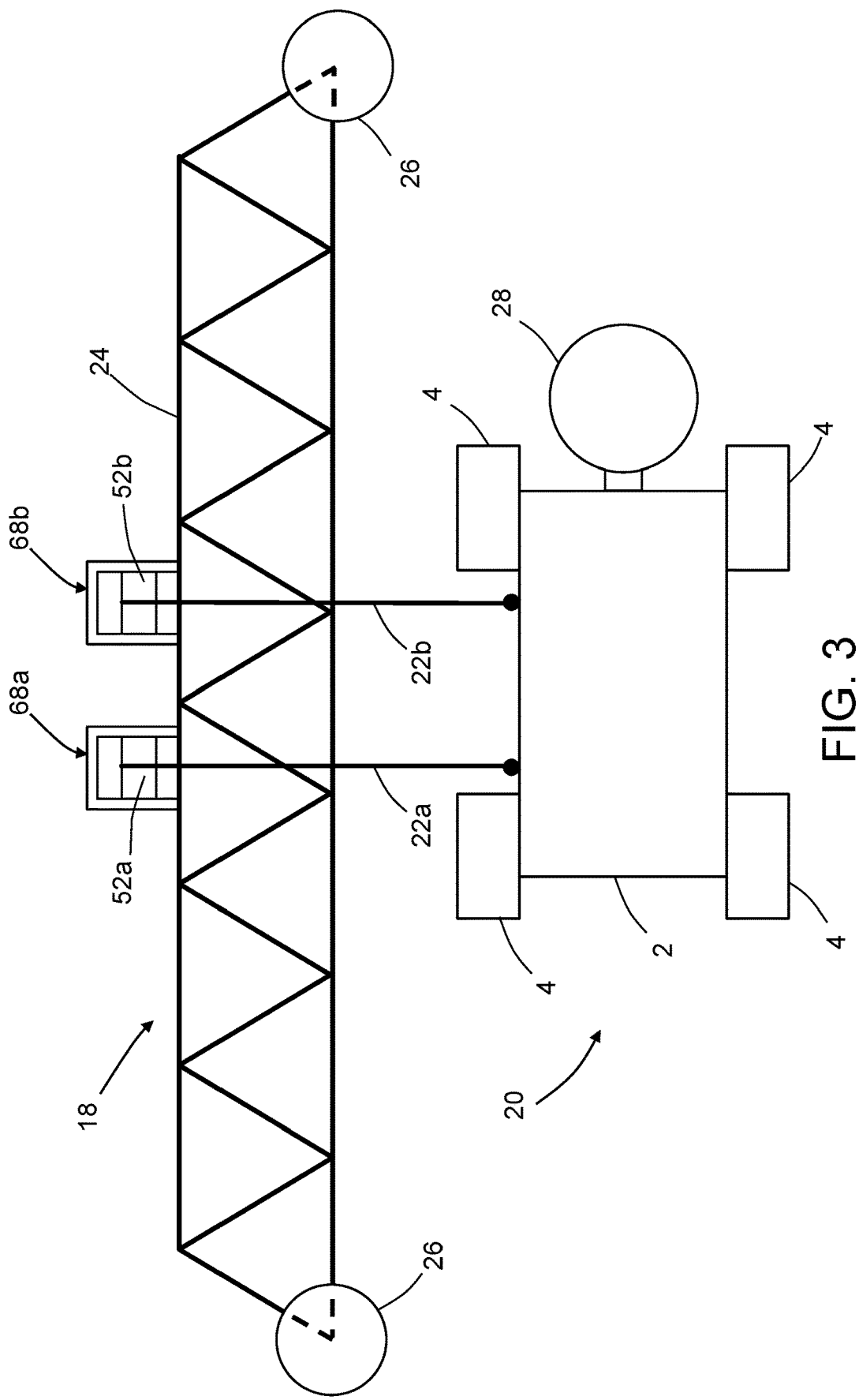
FIG. 3 is a diagram representing a view of an automated apparatus comprising a cart and a multiplicity of crawler vehicles (only one of which is depicted in FIG. 3) connected to the cart by respective pairs of cables in accordance with one embodiment.

In accordance with further alternative embodiments, each crawler vehicle 20 may be connected to the cart 18 by means of a pair of cables. FIG. 3 is a diagram representing a view of an automated apparatus including a cart 18 and a crawler vehicle 20 connected to the cart 18 by a pair of cables 22a and 22b. The uppermost portion of cable 22a is wound around a cable spool 52a that is rotatably coupled to a spool support 68a, which in turn is fixedly coupled to the cart frame 24. Similarly, the uppermost portion of cable 22b is wound around a cable spool 52b that is rotatably coupled to a spool support 68b, which is also fixedly coupled to the cart frame 24. The distal ends of the cables 22a and 22b are respectively attached to one side of the crawler vehicle frame 2 at respective attachment points (indicated by solid dots in FIG. 3). Thus the orientation of the crawler vehicle 20 can be controlled by adjusting the respective lengths of the paid-out portions of cables 22a and 22b. This feature is especially useful in cases wherein the crawler vehicles 20 are of a non-holonomic motion type. If the cable lengths are equal, then the crawler vehicle 20 will travel along a scan path that is parallel to the path traveled by the cart 18.

Referring again to FIG. 1, during travel of the cart 18 from a first spanwise position to a second spanwise position along the leading edge 110 of the wind turbine blade 108 (hereinafter "first pass"), the crawler vehicles 20 disposed at the respective elevations seen in FIG. 1 may travel along mutually parallel paths. In cases where the maintenance tools are NDI probes, the NDI probes on one side of the wind turbine blade 108 may acquire respective sets of NDI sensor data from respective stripe-shaped areas on the surface of wind turbine blade 108, which interrogated areas may be separated by areas not interrogated during the first pass of the cart 18. At the end of the first pass, the elevations of the crawler vehicles 20 may be adjusted so that, during a second pass of the cart 18 from the second spanwise position to the first spanwise position, the NDI probes may acquire respective sets of NDI sensor data from respective stripe-shaped areas on the surface of wind turbine blade 108 which were not interrogated during the first pass. The NDI sensor data acquired during the first and second passes may be stitched together for the purpose of displaying an image of the entire area scanned by the NDI probes.

Figure 4:
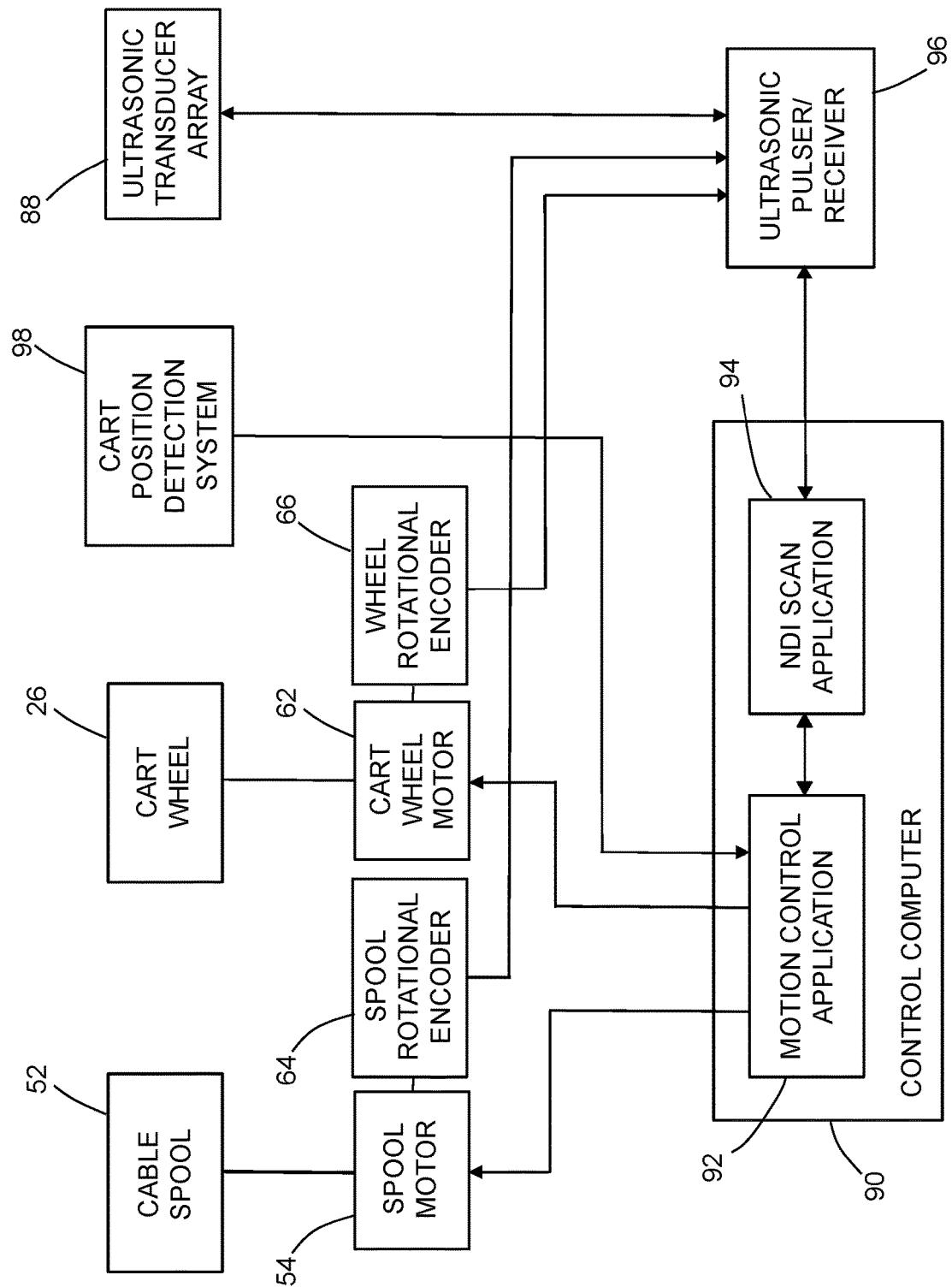
FIG. 4 is a block diagram identifying some components of a computer-controlled apparatus for performing a maintenance operation on a wind turbine blade in accordance with one embodiment.

In accordance with some embodiments, the NDI probes may be ultrasonic transducer arrays. FIG. 4 is a block diagram identifying some components of a system designed for ultrasonic inspection of a wind turbine blade. The system includes a control subsystem that uses rotation encoders to track the relative location (e.g., relative to an initial location acquired using a local positioning system) of each ultrasonic transducer array 88. More specifically, the control system includes a ground-based control computer 90 programmed with motion control application software 92 and NDI scan application software 94. The control computer 90 communicates with a respective motor controller (not shown) that controls operation of a respective spool motor 54. Each spool motor 54 in turn may be operated to drive rotation of a respective cable spool 52 during winding or unwinding of a respective cable 22. The control computer 90 also communicates with a motor controller (not shown) that controls operation of a cart wheel motor 62. The cart wheel motor 62 in turn may be operated to drive rotation of a cart wheel 26. Rotation of the cart wheel 26 drives displacement of the cart 18 along the leading edge 110 of the wind turbine blade 108. More specifically, the cart wheel motor 62 may be coupled to the cart wheel 26 in a manner that allows the cart 18 to be selectively driven to displace either away from or toward the hub 106 of the wind turbine 100.

In accordance with one proposed implementation, each spool motor 54 and the cart wheel motor 62 are stepper motors. The control computer 90 may comprise a general-purpose computer programmed with motion control application software 92 comprising respective software modules for controlling each spool motor 54 and the cart wheel motor 62. The motion control application 92 controls the operation of the motors based on rotation feedback from respective rotational encoders, namely, spool rotational encoder 64 and cart wheel rotational encoder 66. The rotational counts from the encoders are converted into linear measurements. More specifically, a count from the spool rotational encoder 64 represents a distance traveled by the crawler vehicle 20 in a chordwise direction, whereas a count from the cart wheel rotational encoder 66 represents a distance traveled by the cart 18 in a spanwise direction. In one embodiment, the control computer 90 is connected to the motors and encoders via an electronics box (not shown in FIG. 4) and a power/ signal cord (not shown) that connects the ground control workstation with the cart 18 on the wind turbine blade 108. The electronics box contains the system power supplies and integrates all the scanner control connections and provides an interface between the control computer 90 and the power/signal cord 60.

In another embodiment, the control computer 90 communicates wirelessly with the cart 18 via a wireless system such as a radio frequency (RF) system. Inspection information can then be transmitted wirelessly from the cart 18 to the control computer 90 in real-time to enable the remote operator to visually observe the inspection of the wind turbine blade 108 in real-time. In other embodiments, the crawler vehicles 20 may communicate wirelessly and directly with the control computer 90, receiving motor control signals and transmitting inspection information individually.

In accordance with one variation of a wireless embodiment, the cart 18 includes power supplies, e.g., batteries, to drive the various motors to position the cart 18 and the crawler vehicles 20 to perform an inspection of the wind turbine blade 108. In this case the crawler vehicles 20 receive power from the cart 18 by way of respective power cords.

In accordance with other variations of a wireless embodiment, a small internal combustion engine or set of solar panels on each crawler vehicle 20 would power the vacuum motors, Mecanum wheels, controller logic, and wireless communications. In addition, the cart 18 and crawler vehicles 20 may be provided with transceivers for enabling control signals to be sent wirelessly from the cart 18 to each crawler vehicle 20 and inspection information to be sent wirelessly from each crawler vehicle 20 to the cart 18, thus eliminating power/signal cords 60 (i.e., each crawler vehicle 20 would be tethered to the cart 18 by a respective fall protection cable 22, as shown in FIG. 1).

The encoded data from the spool rotational encoder 64 and cart wheel rotational encoder 66 onboard the cart 18 is provided to an ultrasonic pulser/receiver 96, which may be mounted on the cart 18 or at the control workstation. In the former case, the inspection information from the crawler vehicles 20 may be sent to the ultrasonic pulser/receiver 96 onboard the cart 18 via respective power/signal cords 60 or wirelessly. In the latter case, the encoded data from the spool rotational encoder 64 and cart wheel rotational encoder 66 onboard the cart 18 may be sent to the ultrasonic pulser/receiver 96 on the ground via a cable or a wireless communication channel.

Referring again to FIG. 4, the pulser/receiver 96 sends the encoder pulses to the NDI scan application 94. The NDI scan application 94 uses the encoder values to position the scan data in the proper location. The control computer 90 hosts ultrasonic data acquisition and display software that controls the ultrasonic pulser/receiver 96. The ultrasonic pulser/receiver 96 in turn sends pulses to and receives return signals from the ultrasonic transducer array 88. The NDI scan application software 94 controls all details of the scan data and the display of data, including the stitching of data acquired during adjacent sweeps of the ultrasonic transducer arrays 88.

The system depicted in FIG. 4 further includes a cart position detection system 98 that is configured to acquire cart position data representing the initial coordinate position of the cart 18 relative to a coordinate system (i.e., frame of reference) of the wind turbine blade 108. Once the initial coordinate position of the cart 18 has been determined, the data acquired by the cart wheel rotational encoder 66 can be used to track each incremental movement away or toward the initial coordinate position. This enables the control computer 90 to track the spanwise position of the cart 18 during the performance of a maintenance operation on the wind turbine blade 108.

The cart position detection system 98 may take many different forms. For example, the cart position detection system 98 may include a string encoder mounted on the cart 18. The string encoder includes a string having one end which may be attached to a string encoder attachment device fixedly coupled to the root of the wind turbine blade 108. The string encoder can be used to measure the distance of the cart 18 from the hub 106, which in turn enables determination of the spanwise position of the cart 18 on the wind turbine blade. In scanning scenarios in which the NDI probes sweep along adjacent chordwise scan paths, the control computer 90 can be configured to determine and map the spanwise position along the wind turbine blade 108 of each NDI probe, based in part on the spanwise position of the cart 18, and then use that position mapping for each NDI probe to stitch acquired NDI sensor data together for the purpose of imaging a scanned region.

In accordance with an alternative embodiment, the cart position detection system 98 may include a laser range meter mounted on the hub 106 of the wind turbine 100 and an optical target (e.g., a retroreflector) mounted on the cart 18 (or vice versa). The control computer 90 may be programmed to control operation of the laser range meter and receive range data therefrom for wireless transmission to a control station. Measurement data from the laser range meter can be used to obtain estimates of the distance from the laser range meter to the optical target, which distance can be used to compute the spanwise position of the cart 18 in the frame of reference of the wind turbine blade 108. A typical laser range meter comprises a laser diode which transmits a bundled, usually visible, laser beam toward the optical target. The light which is backscattered and/or reflected by the optical target is imaged on the active surface of a photoreceiver by receiving optics. The photoreceiver has a position and an orientation which are fixed relative to the position and orientation of the laser diode. The time-of-flight between transmission and reception of the light can be used to calculate the distance between the laser range meter and the optical target. Alternatively, a distance meter which directionally projects wave energy other than a laser beam could be utilized.

In accordance with a further embodiment, the cart position detection system 98 may include closed-loop feedback control using a motion capture system of the type disclosed in detail in U.S. Pat. No. 7,643,893. In accordance with one embodiment, the motion capture system is configured to measure the spanwise position of the cart 18 as the cart 18 operates within a control volume. A processor receives the measured motion characteristics from the motion capture system and determines a control signal based on the measured motion characteristics. A position control system receives the control signal and continuously adjusts the cart motion to maintain or achieve a desired motion state. The cart 18 may be equipped with optical targets in the form of passive retro-reflective markers. The motion capture system, the processor, and the position control system comprise a complete closed-loop feedback control system.

In addition, the structure and operation of a system that uses optical motion capture hardware for position and orientation tracking of end effectors (e.g., NDI sensors) are disclosed in detail in U.S. Pat. No. 8,892,252. In accordance with a basic system configuration for a motion capture-based tracking method, multiple motion capture cameras (at least two) are set up around a wind turbine blade 108 to create a three-dimensional capture volume that captures motion for all six degrees-of-freedom (6-DoF) of the cart 18. Preferably the cart 18 has a group of passive retro-reflective markers (at least three) attached thereto and arranged in a unique pattern. Each motion capture camera can be a video camera of the type comprising a ring of light-emitting diodes (LEDs) surrounding a camera lens. In conjunction with such cameras, each retro-reflective marker may comprise a hemispherical or ball-shaped body coated with retro-reflective paint that reflects impinging light from the LEDs of each camera back toward the associated lens of the respective camera. The motion capture system utilizes data captured from image sensors inside the cameras to triangulate the three-dimensional position of the target object between multiple cameras configured to provide overlapping projections. The motion capture processor collects real-time image information from all of the motion capture cameras, processes the image data, and sends the information along a dedicated connection to a motion tracking and applications computer. At each frame update, the positions of all of the passive markers in the capture volume can be captured by each camera and converted by the motion capture processor into three-dimensional coordinates, resulting in a full 6-DoF position and orientation representation for the cart 18.

In the specific application described in this disclosure, the motion capture cameras can be placed at any one of the following locations: (a) on a self-supporting structure; (b) on the nacelle 104 of the wind turbine 100; (c) on wind turbine blades other than the wind turbine blade undergoing the maintenance procedure; (d) on the tower support 102; and (e) on the cart 18 pointed back at passive markers attached near the hub 106 of the wind turbine 100.

Figure 6A:
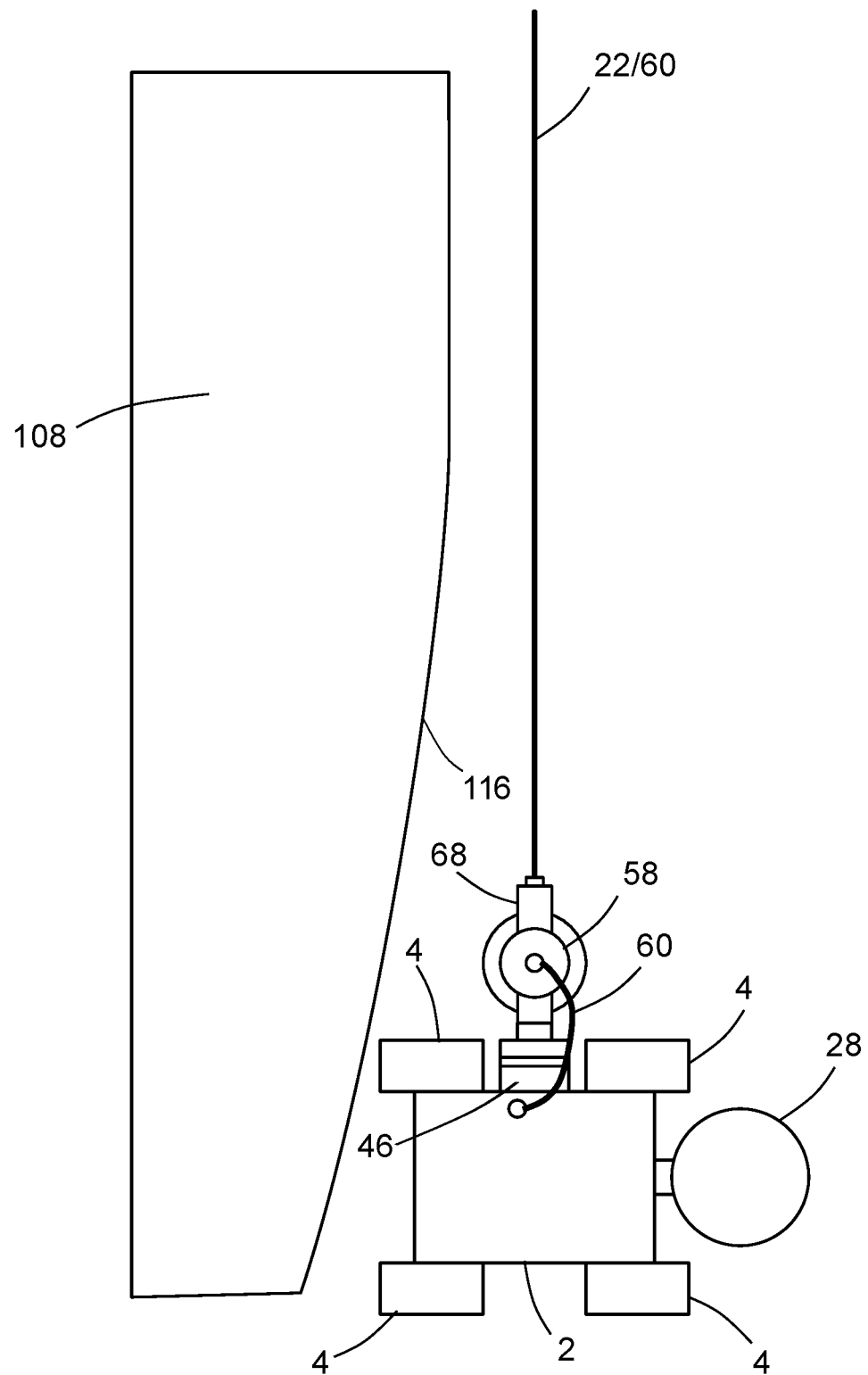
FIGS. 6A through 6D are diagrams representing views of a cable-suspended crawler vehicle during four stages of a procedure for realigning the crawler vehicle with a surface of a wind turbine blade.
Figure 6B:
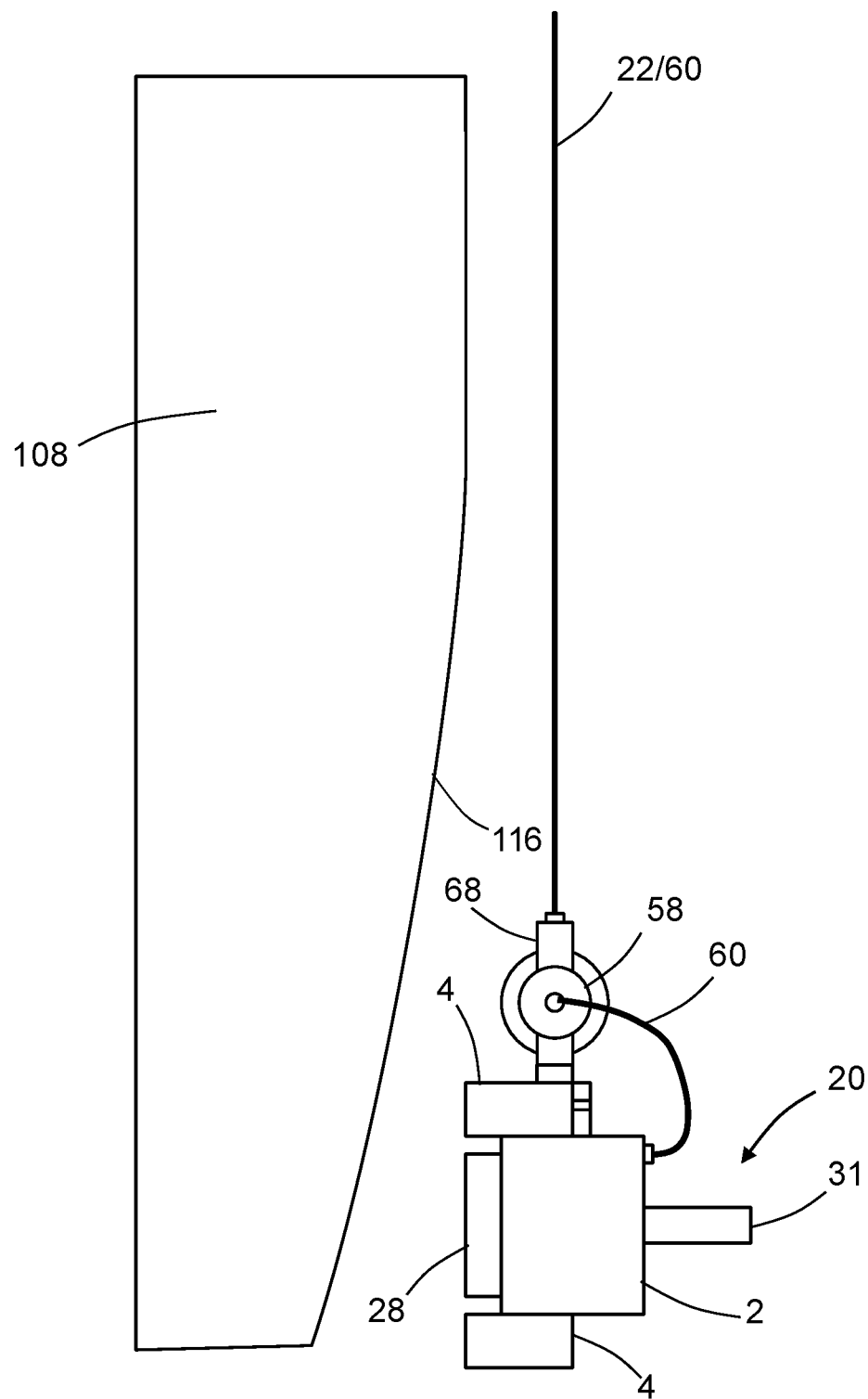

In accordance with some embodiments, the maintenance tool 28 carried by each crawler vehicle 20 may be translatable in a normal direction away from the side surface 114 or 116 of the wind turbine blade 108 to allow the maintenance tool 28 to be lifted over obstacles. In accordance with other embodiments, each crawler vehicle 20 has the ability to re-align with the adjacent side surface 114 or 116 of the wind turbine blade 108 when the crawler vehicle 20 is out of alignment and hanging freely from a cable 22, the wheels 4 of the crawler vehicle 20 not in contact with side surface, as depicted in FIG. 6A (to be described in detail later).

Both of these features (i.e., lifting of the maintenance tool 28 and re-alignment of the crawler vehicle 20) are combined in the embodiment depicted in FIG. 5, which is a plan view of a crawler vehicle 20 connected to a cable 22 having a power/signal cord 60 incorporated therein or attached thereto (hereinafter "cable/cord 22/60"). The crawler vehicle 20 has four wheels with respective axes of rotation that lie in a plane. This plane will be referred to herein as the "crawler vehicle plane". FIGS. 5A and 5B are end and top views respectively of the crawler vehicle 20 depicted in FIG. 5.

Figure 5:
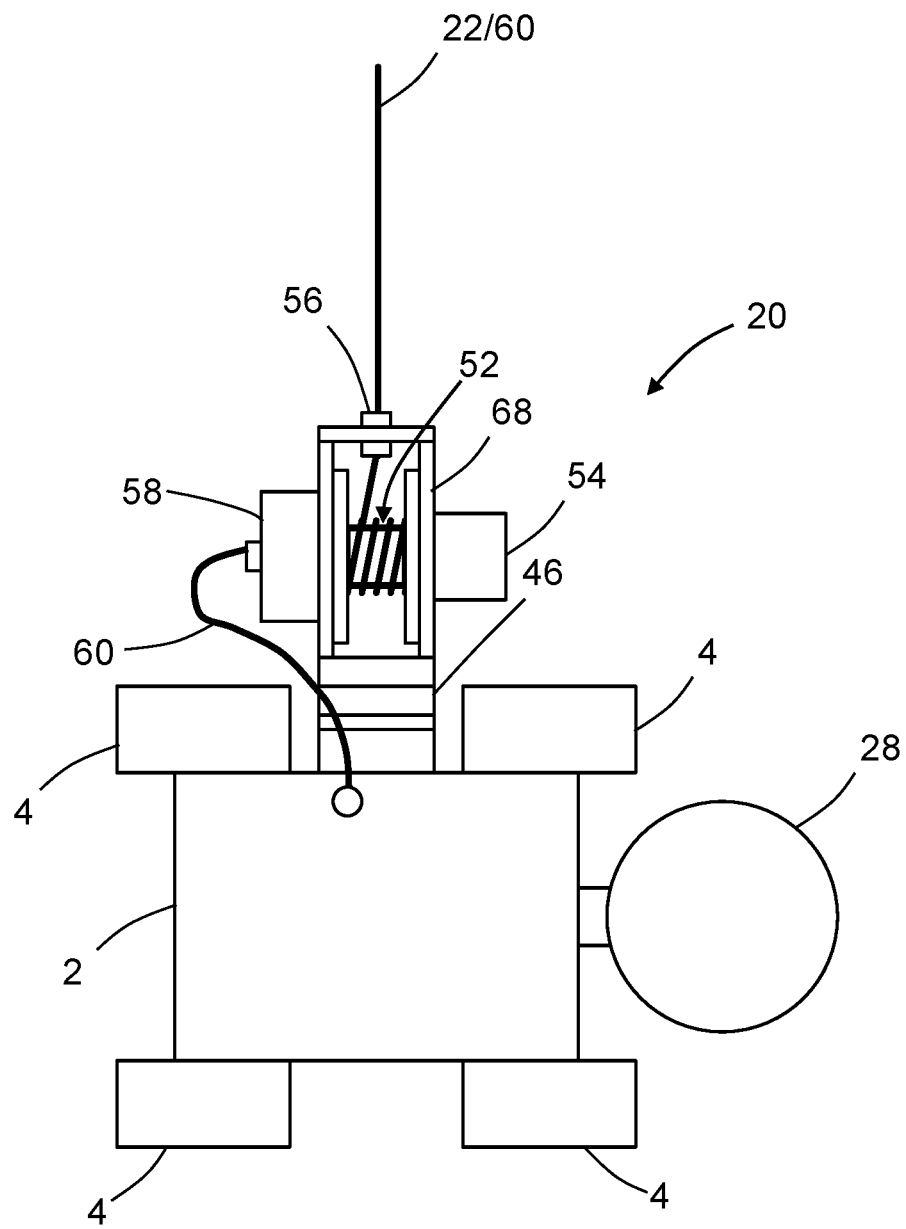
FIG. 5 is a diagram representing a plan view of a cable-suspended crawler vehicle having a turret-mounted cable spool in accordance with one embodiment.
Figure 5A:
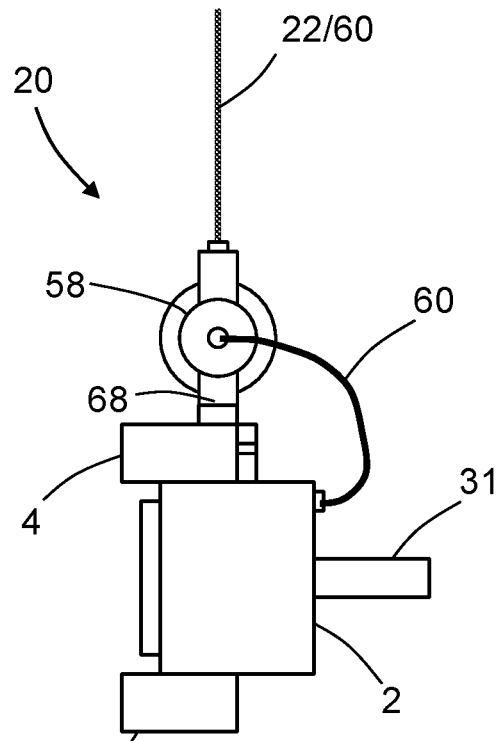
FIGS. 5A and 5B are end and top views respectively of the cable-suspended crawler vehicle depicted in FIG. 5
Figure 5B:
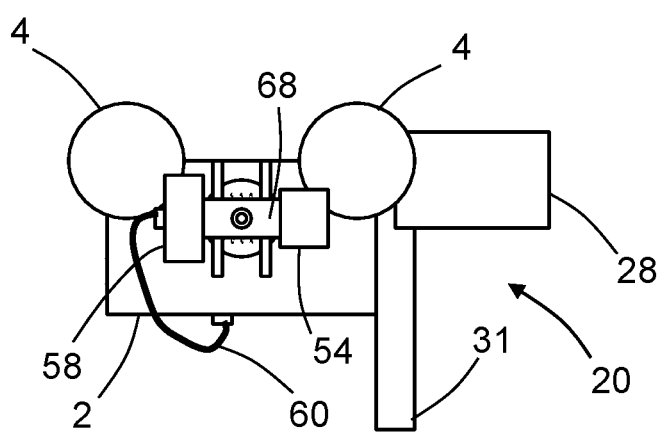

The crawler vehicle 20 depicted in FIG. 5 includes a maintenance tool 28 that is translatable along an axis that is perpendicular to the crawler vehicle plane. This capability enables the maintenance tool 28 to be lifted over obstacles in the path of the crawler vehicle 20. In accordance with one embodiment, the means for translating the maintenance tool 28 away from the surface on which the maintenance operation is being performed may take the form of a linear-motion bearing or linear slide designed to provide free motion in one direction. There are many different types of actuators that may be used with a linear motion bearing. For example, the maintenance tool 28 may be affixed to a carriage that is driven to slide by a linear actuator (e.g., a motorized lead screw, a motorized rack-and-pinion arrangement, a hydraulic actuator or a pneumatic actuator). In response to detection of an obstacle in the path of the crawler vehicle 20, a controller onboard the crawler vehicle 20 activates the linear actuator to cause the maintenance tool 28 to translate to a retracted position whereat contact with the obstacle may be avoided.

The crawler vehicle 20 further includes a cable spool 52 which is rotatably coupled to a spool support 68. The spool support 68 has an opening at the top where the cable/cord 22/60 passes through a cable holder 56 that is inserted in the opening. During uptake or payout (i.e., winding or unwinding) of the cable/cord 22/60, the cable spool 52 is driven to rotate by a spool motor 54 that is mounted to the spool support 68. The axis of rotation of the cable spool 52 is collinear with a spool axle (not shown in FIG. 5, but see spool axle 50 in FIG. 11) of the cable spool 52.

The spool support 68 in turn is fixedly coupled to a rotatable portion of an alignment turret 46. A fixed portion of alignment turret 46 is fixedly coupled to the crawler vehicle frame 2. The rotatable portion of the alignment turret 46 is rotatable relative to the fixed portion of the alignment turret 46 about an axis of rotation which is perpendicular to the spool axle 50 of the cable spool 52 and parallel to the crawler vehicle plane. The rotatable portion of the alignment turret 46 is driven to rotate by a turret motor (not shown in FIG. 5, but see turret motor 48 in FIG. 11). Thus the spool support 68 is rotatable about an axis of rotation of the alignment turret 46. The utility of this alignment feature will be explained more fully below with reference to FIGS. 6A through 6D.

Still referring to FIG. 5, each crawler vehicle 20 further includes a multiplicity of motors (not shown in FIG. 5, but see FIG. 11) that receive electrical power via the power/signal cord 60 that extends from the cart 18 to the crawler vehicle 20. The power/signal cord 60 also provides control signals from a controller (e.g., a computer system) which controls the operation of the motors on the crawler vehicle 20. In cases where the maintenance tool 28 is an NDI probe, the power/signal cord 60 also provides a pathway for sending NDI sensor data acquired by the NDI probe to a transceiver onboard the cart 18, which transceiver relays the NDI sensor data to a ground station (e.g., control computer 90 in FIG. 4).

As seen in FIG. 5, the power/signal cord 60 includes: (a) a first section that extends from the cart 18 in parallel with the cable 22, separates from the cable 22 at the cable spool 52 and then enters a cord counter-reel 58; and (b) a second section that exits the cord counter-reel 58 and connects to an electronics box (not shown in FIG. 5) mounted to the crawler vehicle frame 2. The cord counter-reel 58 compensates for cord twisting due to spool rotation, which allows the power/signal cord 60 to be unbrokenly routed to the electrical components mounted to the crawler vehicle frame 2. Within the cord counter-reel 58, a portion of the power/signal cord 60 is pre-twisted in a direction opposite to the direction of spool rotation. When the cable spool 52 rotates during uptake, the portion of the power/signal cord 60 within the cord counter-reel 58 counter-rotates to untwist the power/signal cord 60, thus avoiding cord kinking.

In accordance with an alternative embodiment, instead of an unbroken power/signal cord, electrically conductive brushes that contact concentric electrically conductive rings on one spool face may be employed. Each wire from the source section of the cord is connected to an individual ring, and a corresponding wire from the crawler vehicle section of the cord is connected to a corresponding brush. As the cable spool 52 rotates, the brushes maintain contact with their rings, thereby enabling continuous supply of power and continuous communication of signals regardless of spool rotation. In accordance with further alternative embodiments, the crawler vehicles may communicate wirelessly with a ground-based control station while receiving electrical power from batteries mounted on the cart 18. This would avoid the use of a multiplicity of power/signal cords running from the crawler vehicles 20 to the ground-based control station via the cart 18. The wireless communications would include: (a) the sending of control signals from a transceiver at the ground-based control station to transceivers on the cart 18 and on the crawler vehicles 20, which control signals are then forwarded to the motor controllers onboard cart 18 and crawler vehicles 20 for controlling movements of the crawler vehicles 20; and (b) the sending of data acquired by the NDI sensor units onboard the crawler vehicles 20 from the transceivers onboard the crawler vehicles 20 to the transceiver at the ground-based control station.

Figure 6C:
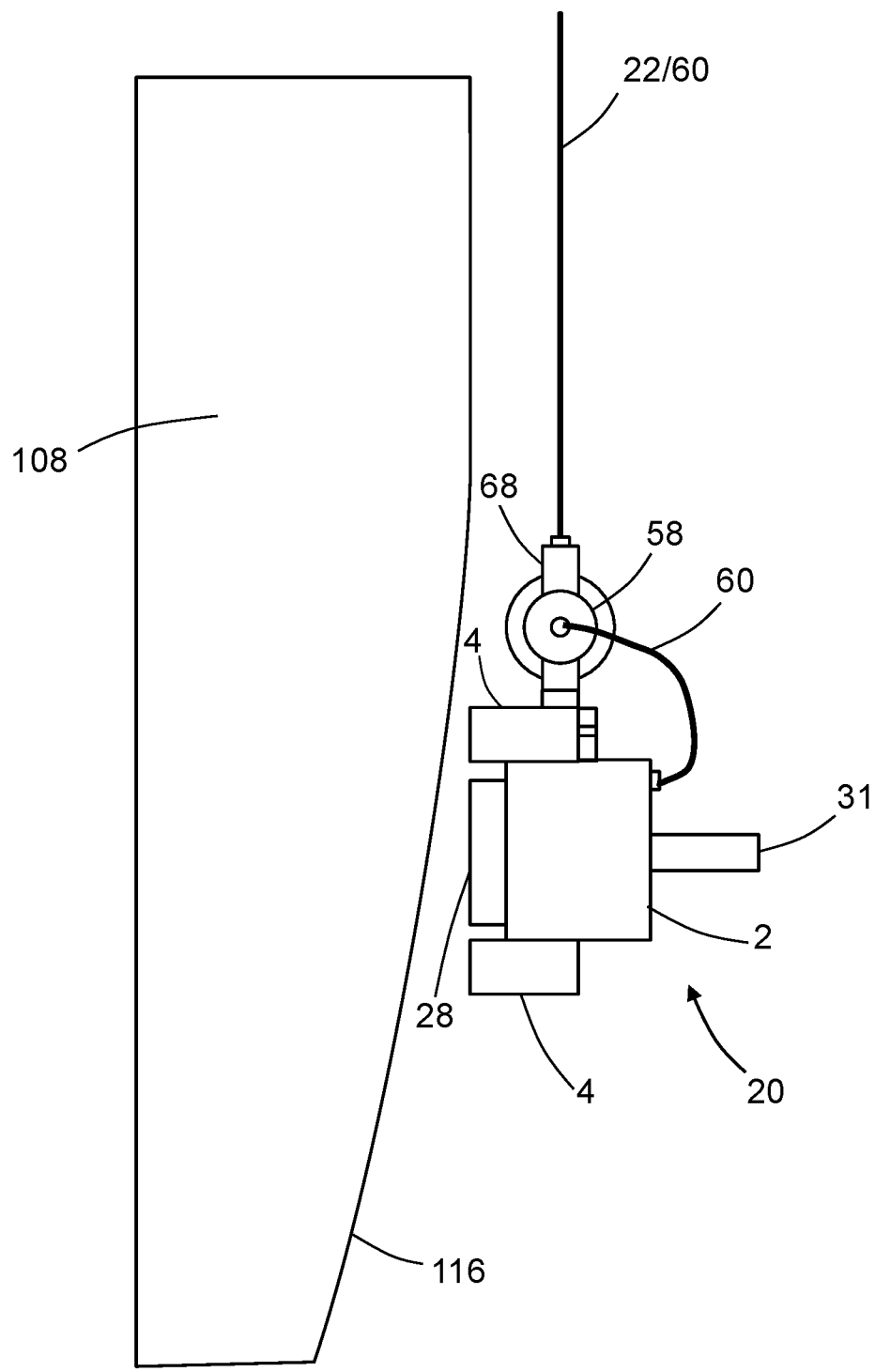
Figure 6D:
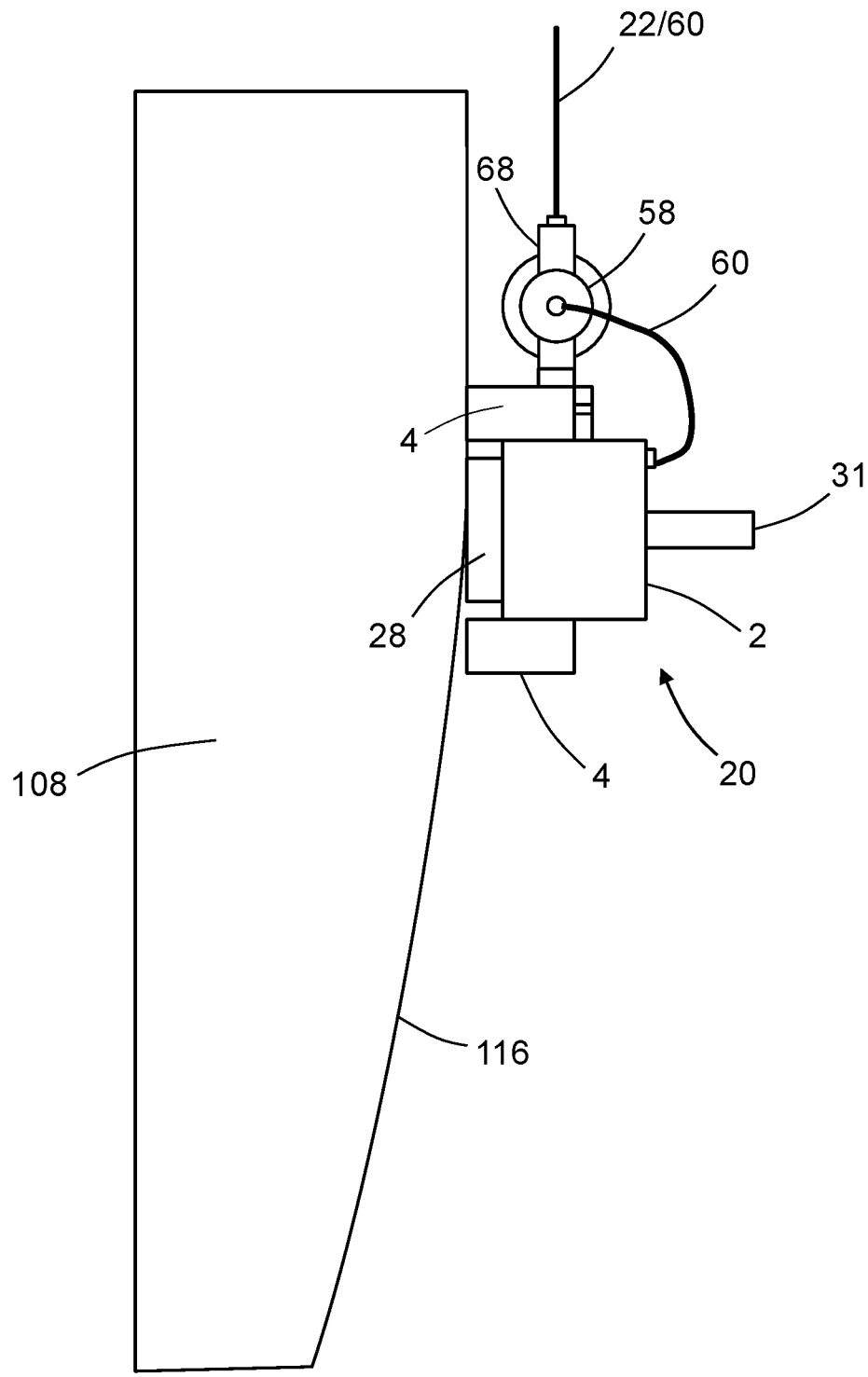

In accordance with a further beneficial aspect, the ability of the crawler vehicle 20 to rotate about an axis of the cable 22 when none of wheels 4 are in contact with the wind turbine blade 108 can be used in a procedure for re-aligning the crawler vehicle 20 with a surface of the wind turbine blade 108. FIGS. 6A through 6D are diagrams representing views of a cable-suspended crawler vehicle 20 during a procedure for re-aligning the crawler vehicle with a surface of a wind turbine blade. Initially (as seen in FIG. 6A) the crawler vehicle 20 is supported by the cable 22 only and not in contact with the wind turbine blade 108. In addition, the crawler vehicle 20 is not aligned with the wind turbine blade 108. In accordance with an alignment procedure, the rotatable portion of the turret 46 is rotated by a number of degrees relative to the fixed portion of the turret 46, which rotation causes the crawler vehicle 20 to rotate about an axis of the cable 22 the same number of degrees in an opposite direction relative to cable spool 52, which does not rotate relative to the cable 22. In the example depicted in FIGS. 6A and 6B, the crawler vehicle is rotated by about 90 degrees. At the end of this rotation, the four wheels 4 all face toward the wind turbine blade with the orientation depicted in FIG. 6B. In the next stage of the alignment procedure, the cable spool 52 is rotated to take-up a length of cable 22 sufficient to lift the crawler vehicle 20 to an elevation whereat at least two of the wheels 4 are in contact with the side surface 116 of the wind turbine blade, as seen in FIG. 6D. FIG. 6C shows the crawler vehicle 20 at an intermediate elevation during lifting from the elevation seen in FIG. 6B to the elevation seen in FIG. 6D.

In accordance with some embodiments of the system proposed herein, holonomic-motion crawler vehicles are employed. One embodiment of a holonomic-motion crawler vehicle 20a capable of traveling on a non-level surface will now be disclosed for the purpose of illustration. While the disclosed embodiment carries a non-destructive inspection sensor for inspecting the surface on which the crawler vehicle travels, the holonomic-motion crawler vehicle 20a disclosed herein can alternatively carry other types of tools, such as tools needed in maintenance or painting operations.

Figure 7:
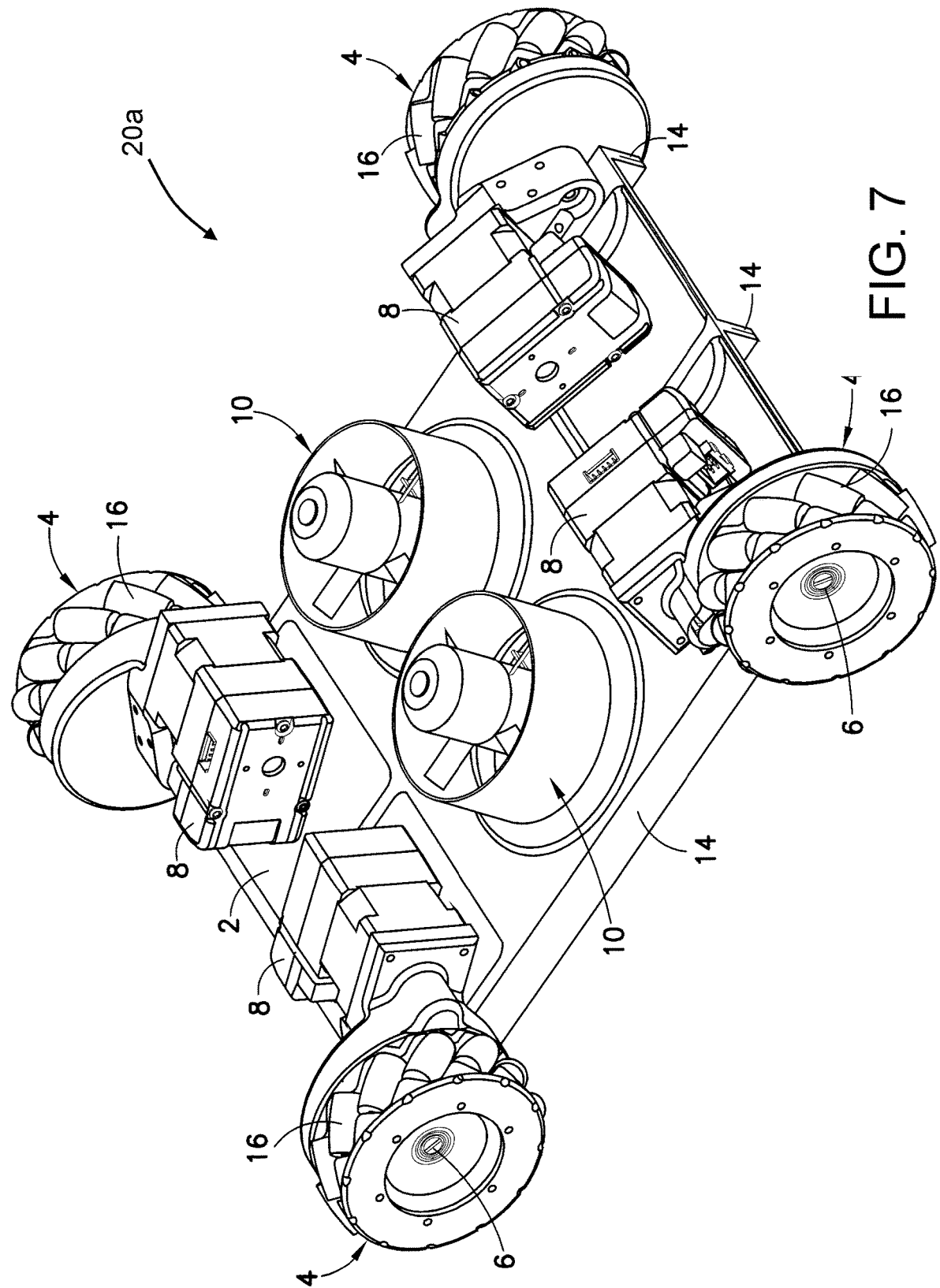
FIG. 7 is a diagram representing an isometric view of parts of a holonomic-motion crawler vehicle having two suction zones in accordance with one embodiment. The electrical connections for supplying signals for controlling operation of the depicted components and other components are not shown.

FIG. 7 shows parts of a holonomic-motion crawler vehicle 20a having four Mecanum wheels 4 and two suction zones 12 in accordance with one embodiment. The electrical connections for supplying signals for controlling operation of the depicted components are not shown. This holonomic-motion platform comprises a crawler vehicle frame 2 with four Mecanum wheels 4 (two type "A" and two type "B") mounted to the crawler vehicle frame 2 by means of respective axles 6, and further comprises four independently controlled stepper motors 8 (one per wheel). The Mecanum wheels 4 are arranged with the "A" pair on one diagonal and the "B" pair on the other, with each having its axle 6 perpendicular to a line running through the center of the vehicle. Each stepper motor 8 controls the rotation of a respective wheel 4.

Figure 8:
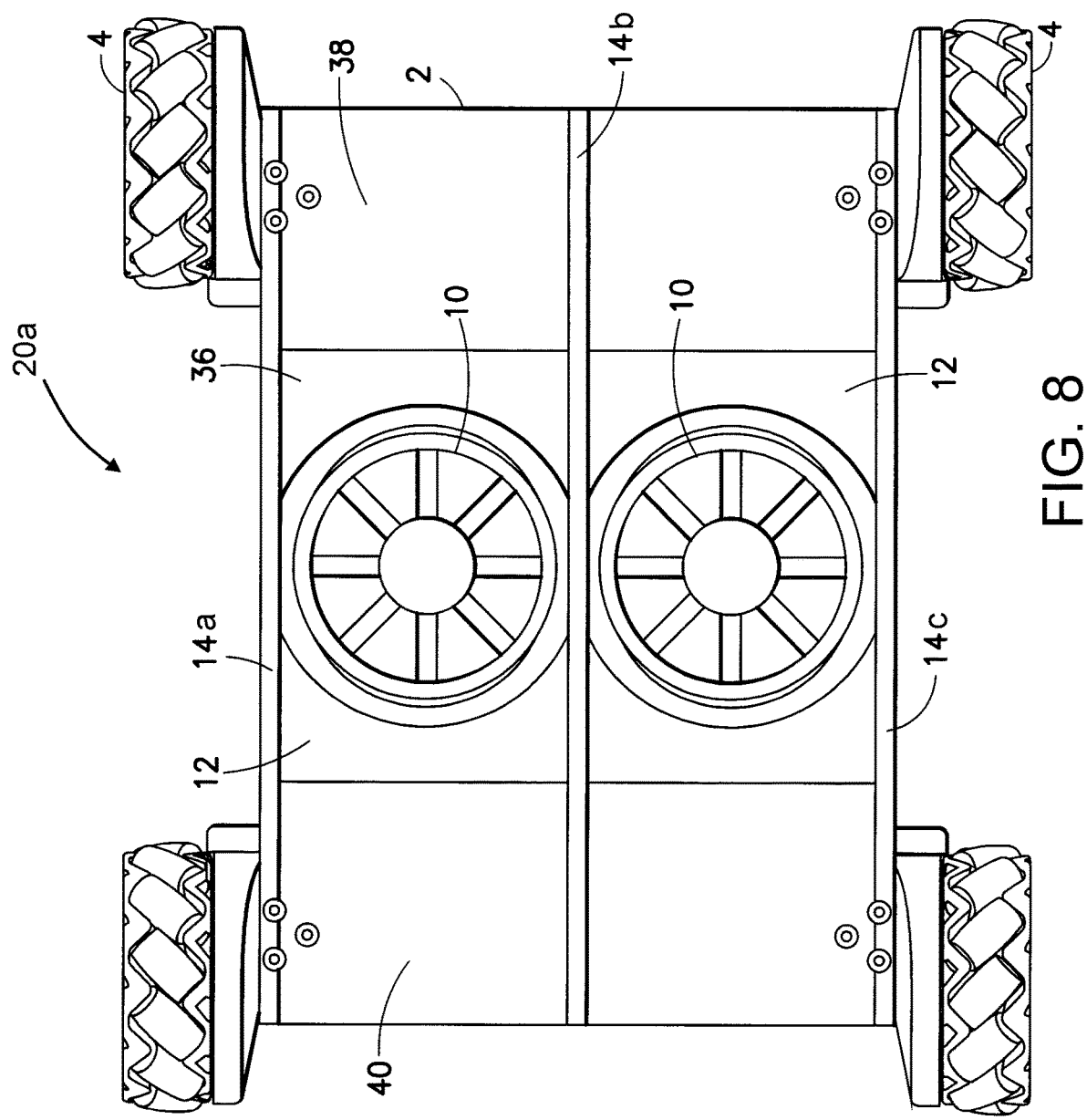
FIG. 8 is a diagram showing a top view of a prototype of a Mecanum-wheeled crawler vehicle having dual suction zones.
Figure 11:
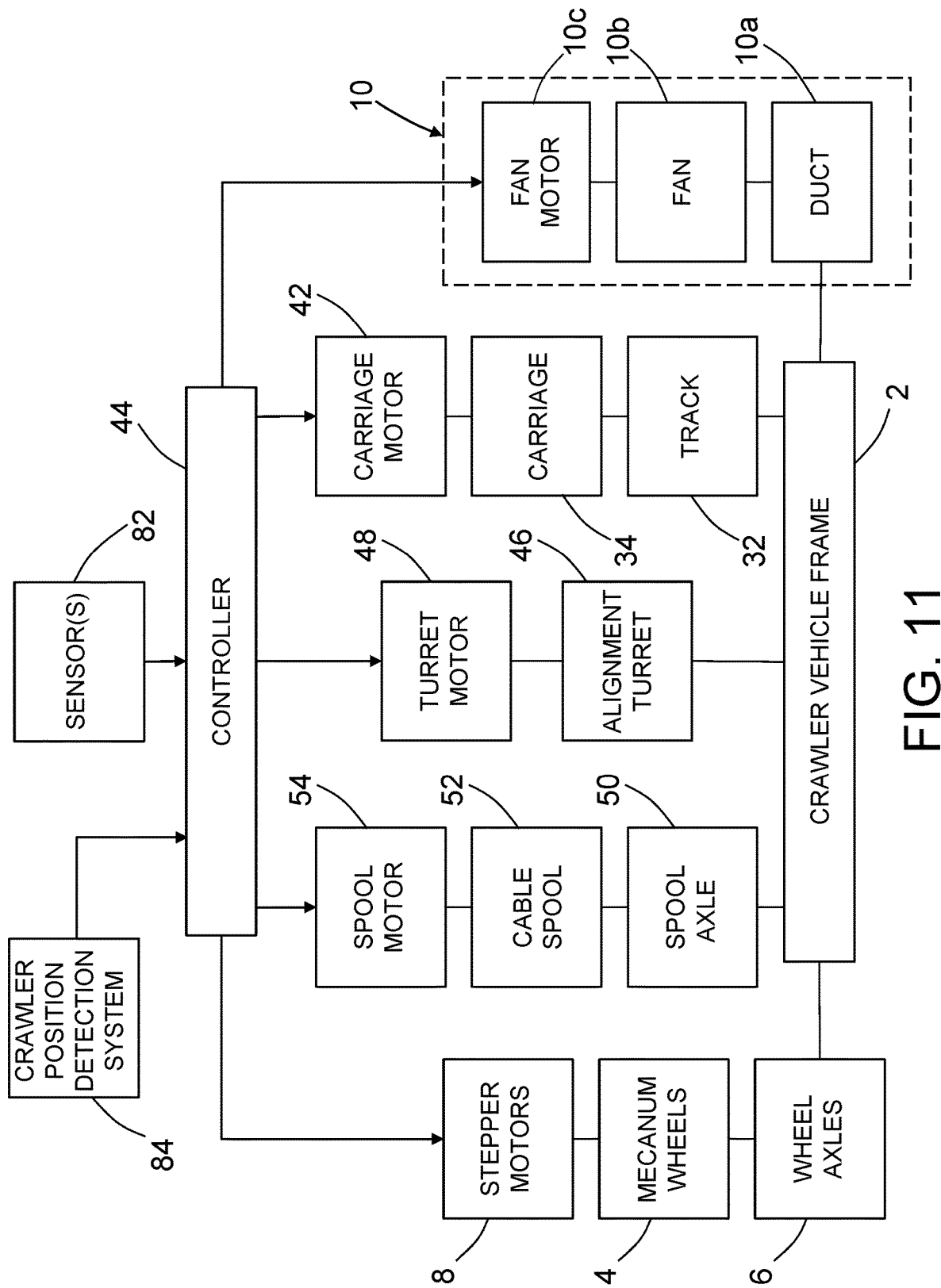
FIG. 11 is a block diagram identifying some components of a holonomic-motion crawler vehicle in accordance with another embodiment.

The embodiment depicted in FIG. 7 also has two suction devices 10 arranged side by side in the middle of the crawler vehicle frame 2, midway between the front and rear wheels. In this particular embodiment, each suction device 10 is a respective electric ducted fan which is mounted in a respective opening (not shown in FIG. 7) formed in the frame 2. As indicated in FIG. 11, each suction device 10 comprises a fan 10b which is rotatable about an axis, a duct 10a surrounding the fan, and an electric fan motor 10c which drives the fan 10b to rotate in a direction such that air is propelled from a respective channel or space underneath the crawler vehicle frame 2 (hereinafter "suction zone 12" depicted in FIG. 8) up through the fan duct 10a, thereby creating suction in the corresponding suction zone 12. Although the disclosed embodiments have a perpendicular fan axis, a perpendicular mounting is not critical to the design. Suction can still be generated if the fan were mounted in other ways, e.g., with a curved duct to channel the air input to the fan 10b from under the vehicle. As seen in FIG. 8, the two suction zones 12 are bounded on opposing sides by three longitudinal low-surface-friction flexible skirts 14a-14c which are attached to the frame 2, the middle skirt 14b forming a common boundary wall separating the two suction zones 12. The skirts 14a-14c may extend downward so that their bottom edges contact the surface on which the holonomic-motion crawler vehicle 20a is moving. It should be appreciated that non-holonomic-motion embodiments of the crawler vehicles 20 depicted in FIG. 1 may be provided with suction devices 10 and suction zones 12 similar in construction to the configuration shown in FIGS. 7 and 8.

FIG. 8 shows a bottom view of the holonomic-motion crawler vehicle 20a depicted in FIG. 7. The underside of the crawler vehicle frame 2 is shaped to provide two suction zones 12 and has low-surface-friction skirts 14a-14c that conform to non-flat surfaces. Each suction device 10 is installed in a respective opening in the crawler vehicle frame 2 and is in fluid communication with a respective suction zone 12 defined by the frame bottom surface and the skirts. In the case wherein the suction devices 10 are electric ducted fans, each electric ducted fan propels air upward, thereby sucking air from the shaped suction zones 12. The suction devices 10 can be independently controlled to apply different suction forces to the surface underneath the respective suction zones 12.

In accordance with one proposed implementation, the crawler vehicle depicted in FIG. 8 has dual suction zones 12 separated by a common skirt 14b which bisects the bottom surface of the crawler vehicle frame 2 along a longitudinal axis. In this particular construction, the upper half of the bottom surface between the uppermost and middle skirts 14a and 14b comprises a flat central surface 36 having an opening in which the suction device 10 is installed. This flat central surface 36 is flanked by forward and rearward convex surface 38 and 40. Each convex surface 38 and 40 may be an aerodynamically streamlined surface which forms a respective throat with opposing portions of the surface on which the holonomic-motion crawler vehicle 20a is moving.

Thus, the contoured bottom surface of the frame crawler vehicle 2, the skirts 14a-14c and the surface on which the crawler vehicle is moving define respective channels that allow sufficient air to be sucked up through the corresponding electric ducted fan to generate a desired suction force.

Although not shown in FIG. 7, the holonomic-motion crawler vehicle 20a may be connected to a power/signal cord 60 which supplies electrical power to the stepper motors 8 and suction devices 10 on the vehicle. The power/signal cord 60 also provides control signals from a controller 44 (see FIG. 11) which controls the operation of the stepper motors 8 and suction devices 10. The holonomic-motion crawler vehicle 20a may further include a converter box (not shown) mounted to the frame 2. The converter box converts USB signals from the controller 44 into pulse-width-modulated (PWM) signals for controlling the fan motors 10c (see FIG. 11).

In accordance with an alternative embodiment, the holonomic-motion crawler vehicle 20a could be battery-powered, instead of receiving electrical power via a power/signal cord 60. Also the motor controller could be a microprocessor or microcomputer mounted onboard the crawler vehicle, rather than using a ground-based computer to control the holonomic-motion crawler vehicle 20a by means of control signals carried by the power/signal cord. Alternatively, the motors onboard the holonomic-motion crawler vehicle 20a can be controlled via a wireless connection to an off-board controller.

As previously mentioned, the holonomic-motion crawler vehicle 20a shown in FIG. 7 utilizes four Mecanum wheels 4. Each Mecanum wheel 4 has a multiplicity of tapered rollers 16 rotatably mounted to its circumference, each tapered roller 16 being freely rotatable about its axis. These tapered rollers 16 have an axis of rotation which lies at a 45° angle with respect to the plane of the wheel. Type "A" Mecanum wheels have left-handed rollers, while Type "B" Mecanum wheels have right-handed rollers. The holonomic-motion crawler vehicle 20a can be made to move in any direction and turn by varying the speed and direction of rotation of each Mecanum wheel 4. For example, rotating all four wheels 4 in the same direction at the same rate causes forward or backward movement; rotating the wheels on one side at the same rate but in the opposite direction of the rotation by the wheels on the other side causes the vehicle to rotate; and rotating the Type "A" wheels at the same rate but in the opposite direction of the rotation of the Type "B" wheels causes sideways movement.

Figure 13:
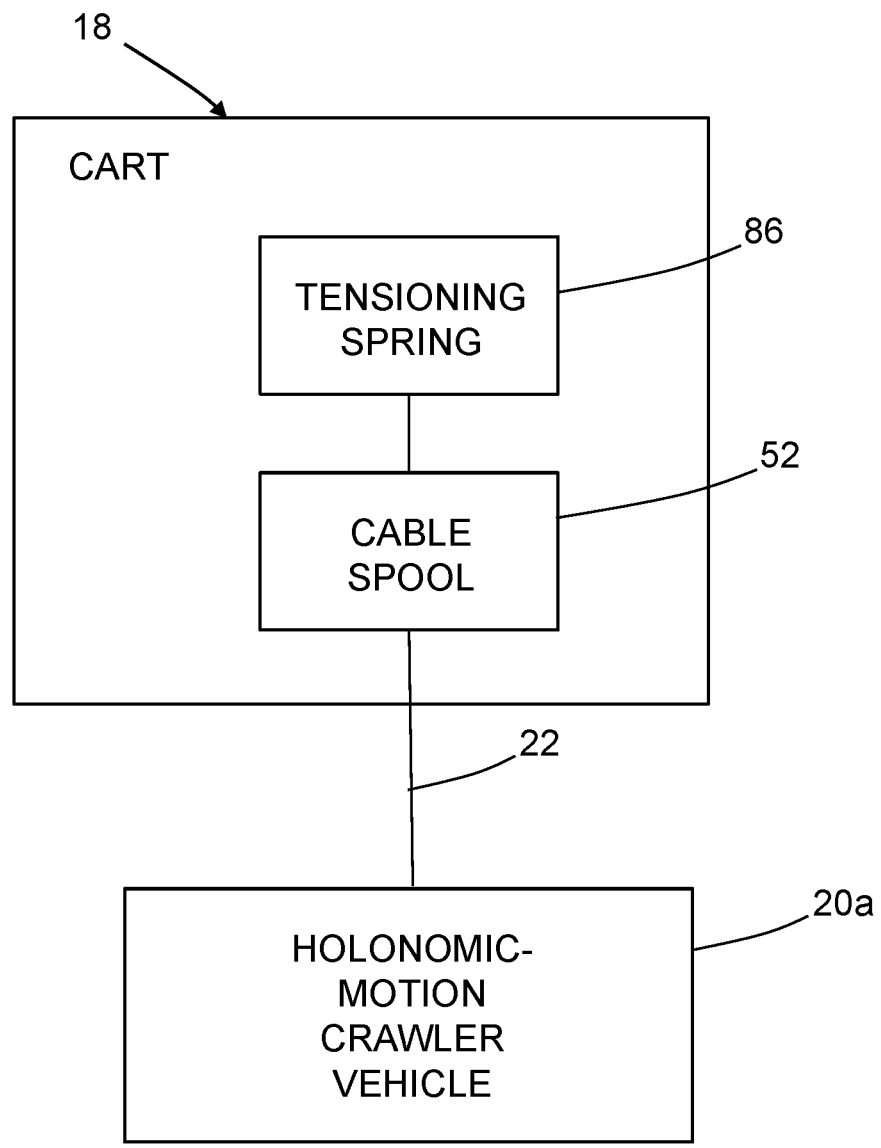
FIG. 13 is a block diagram identifying some components of a system that provides a spring force that urges a cable spool to rotate in a cable winding direction to assist vertical upward movement of a holonomic-motion crawler vehicle in opposition to the force of gravity.

For example, the crawler vehicles 20 depicted in FIG. 1 may be holonomic-motion crawler vehicles 20a of the type depicted in FIG. 7, in which case the ability to move sideways would enable those holonomic-motion crawler vehicles 20a to move up and down (i.e., in a chordwise direction) without motorized winding and unwinding of the cables 22. To assist sideways movement of the holonomic-motion crawler vehicles 20a in this embodiment, the cable spools 52 may be provided with tensioning springs 86 (see FIG. 13) that at least partially counteract the force of gravity exerted on the holonomic-motion crawler vehicles 20a. This assisting can be made via tensioned lines that pull and roll up or a "puller mechanism" at the crawler vehicle. The tensioning springs 86 are configured for respectively urging the multiplicity of cable spools 52 to rotate in a direction that causes respective winding of the multiplicity of cables 22 on the multiplicity of cable spools 52. The spring forces exerted by the spring-tensioned spools with the cables 22 wrapped around help the holonomic-motion crawler vehicles 20a to crawl back up toward the cart 18. (The holonomic-motion crawler vehicles 20a have no problem descending in opposition to the spring force because they are powered.) This anti-gravity assist feature allows the use of smaller motors and reduces power requirements on the holonomic-motion crawler vehicles 20a. The cable spools 52 and tensioning springs 86 could also be mounted on the holonomic-motion crawler vehicles 20a rather than on the cart 18. This spring-loaded anti-gravity assist is not required, but should be considered an option, depending upon what load is being carried by the crawler vehicle for the intended maintenance activity.

The holonomic-motion crawler vehicle 20a disclosed herein has multiple applications. In accordance with one application, the crawler vehicle will carry an ultrasonic sensor, but other types of sensors, such as eddy-current sensors or cameras can be carried. The sensor may be a single sensing element or an array of sensing elements. Cameras, tools, painting equipment, a laser marking system, a robotic arm manipulator, or other devices could also be carried by the platform.

Figure 9:
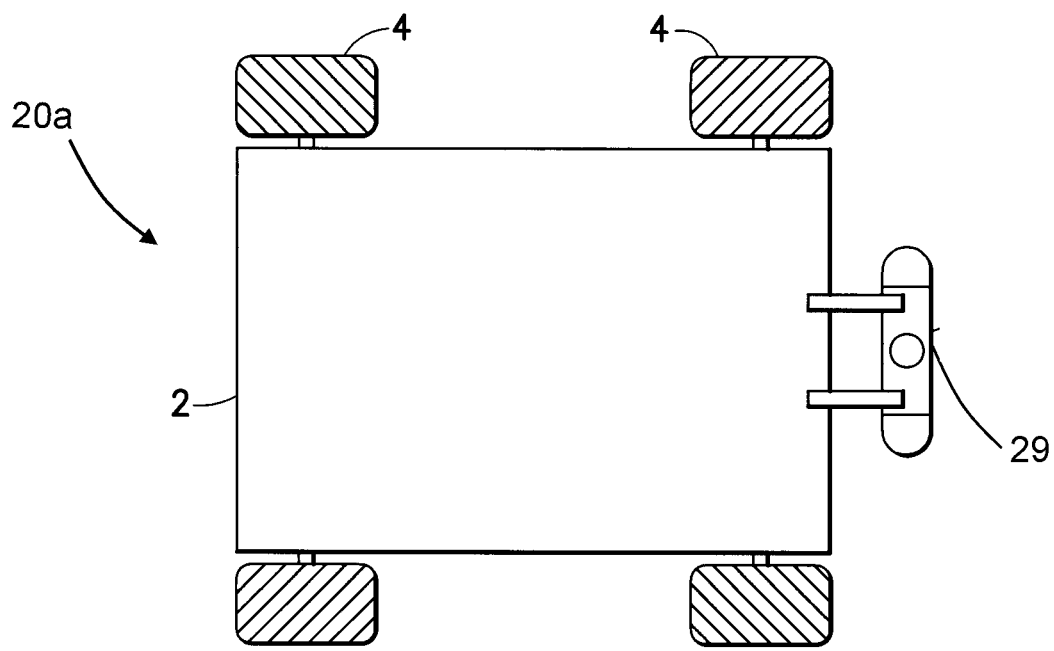
FIG. 9 is a diagram representing a top view of a Mecanum-wheeled frame of a crawler vehicle having a fixed NDI scan head attached to one end thereof.

FIG. 9 shows a version of the holonomic-motion crawler vehicle 20a with a fixed ultrasonic sensor unit 29 mounted to one end of the crawler vehicle frame 2. The ultrasonic sensor unit 29 can scan an underlying surface in the direction in which the vehicle crawls. The ultrasonic sensor unit 29 may include a single ultrasonic sensing element or an array of ultrasonic sensing elements.

Figure 10:
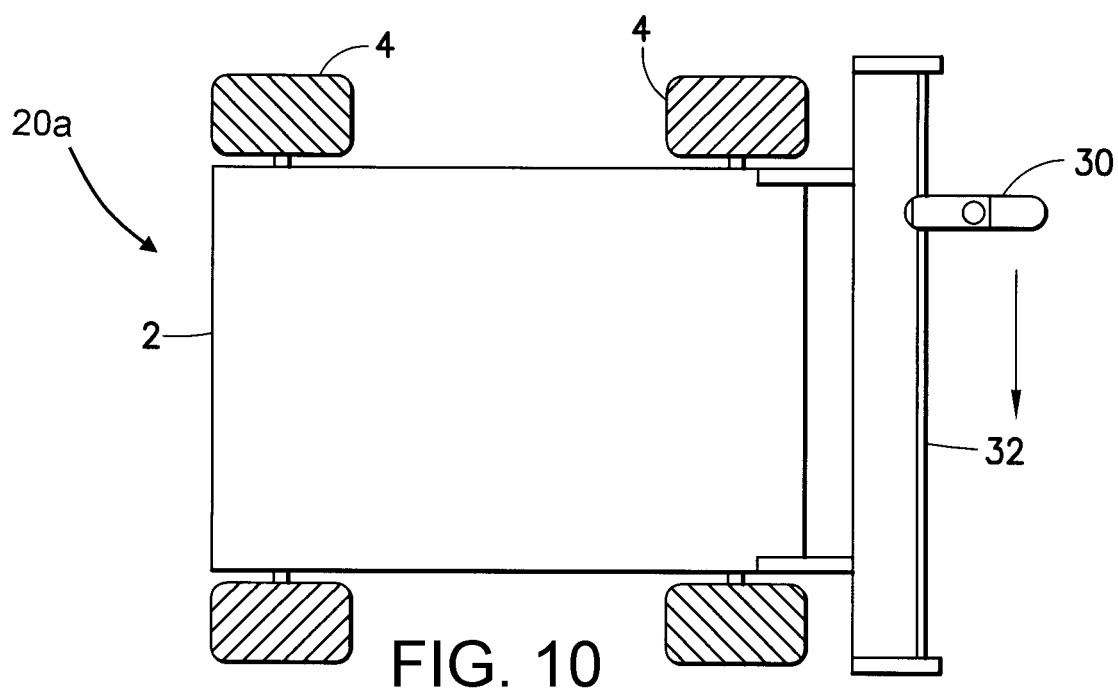
FIG. 10 is a diagram representing a top view of a Mecanum-wheeled frame of a crawler vehicle having a reciprocating NDI scan head mounted to one end thereof.

FIG. 10 shows another version of the holonomic-motion crawler vehicle 20a with a scanning ultrasonic sensor unit 30 mounted on a carriage (not visible in FIG. 10) that is translatably coupled to a track 32 fixed to one end of the crawler vehicle frame 2. The scanning ultrasonic sensor unit 30 can slide back and forth along the track 32, scanning a transverse area of underlying surface while the holonomic-motion crawler vehicle 20a is stationary and while the cart 18 is stationary. Again, the scanning ultrasonic sensor unit 30 may be a single sensing element or an array of sensing elements. The holonomic-motion crawler vehicle 20a can be moved forward in increments, pausing after each incremental move to allow the ultrasonic sensor unit 30 to scan along a transverse line. A controller (see controller 44 in FIG. 11) can be programmed to control the movements of the holonomic-motion crawler vehicle 20a and the scanning ultrasonic sensor unit 30 to produce a pre-programmed pattern for scanning all of a surface area assigned to the particular holonomic-motion crawler vehicle 20a.

During the performance of a maintenance operation, the concurrent movements of a multiplicity of crawler vehicles may be tracked using any one of a variety of crawler vehicle position detection systems. Knowing where each crawler vehicle is located at any time is important. For example, in cases where the maintenance tools are NDI probes, the locations of the NDI probes are correlated with the acquired NDI sensor data to ensure full coverage and potentially create an NDI map of the surface of the wind turbine blade. Along-blade positioning (i.e., in a spanwise direction) is done using measurements already discussed. Across-blade positioning (i.e., in a chordwise direction) can be done in the following ways:

(a) String encoders extending from the cart 18 to each crawler vehicle 20 may be used.
(b) Wheel rotational encoders on each crawler vehicle 20 may be used to track vertical motion (and also horizontal motion if crawling forward and backward is done).
(c) Laser-based methods may be used. For example, a laser-based crawler vehicle position detection system may include laser range meters mounted on the cart 18 and aimed at optical targets mounted on each crawler vehicle 20. To enable lines-of-sight to be maintained, the laser devices may be mounted on the distal ends of robotic (e.g., articulated) arms that extend from each side of the cart 18, while the optical targets are mounted on the crawler vehicles 20 in a manner such that the emitted laser beams impinge on those optical targets.
- (d) Camera- or video-based methods may be used, such as motion capture using optical targets mounted on each crawler vehicle 20.
- (e) Rotational encoders coupled to the cable spools 52 may be used to provide the across-blade location determination.

FIG. 11 is a block diagram identifying some components of a holonomic-motion crawler vehicle in accordance with another embodiment. This holonomic-motion crawler vehicle includes a crawler vehicle frame 2 having a set of four wheel axles 6 fixedly coupled thereto. A set of four Mecanum wheels 4 are rotatably coupled to respective wheel axles 6. A set of four stepper motors 8 are configured to respectively drive rotation of the Mecanum wheels 4 in response to control signals received from a controller 44 (e.g., a computer system). In addition, one or more suction devices 10 are incorporated in the crawler vehicle frame 2. Each suction device 10 includes a fan 10b which is rotatable about an axis, a duct 10a surrounding the fan, and an electric fan motor 10c which drives the fan 10b to rotate in response to control signals received from the controller 44. The holonomic-motion crawler vehicle further includes a spool axle 50 fixedly coupled to the crawler vehicle frame 2, a cable spool 52 rotatably coupled to the spool axle 50, and a spool motor 54 configured to drive rotation of the cable spool 52 in response to control signals received from the controller 44. In addition, the holonomic-motion crawler vehicle further includes: an alignment turret 46 having a non-rotatable portion fixedly coupled to the crawler vehicle frame 2 and having a rotatable portion to which the cable spool 52 is fixedly coupled; and a turret motor 48 configured to drive rotation of the alignment turret 46 in response to control signals received from the controller 44. In addition, the holonomic-motion crawler vehicle partly represented in FIG. 11 may comprise a vertical track 32 mounted to the crawler vehicle frame 2. A carriage 34, to which the maintenance tool 28 (not shown in FIG. 11) is fixedly coupled, is translatably coupled to the track 32 and driven to rotate by a carriage motor 42 (by way of a gear train not shown) in response to control signals received from the controller 44. All of the motors identified in FIG. 11 are mounted to the crawler vehicle frame 2. The controller 44 is configured to control operation of the motors so that each holonomic-motion crawler vehicle performs a maintenance operation in a respective area of the surface of the wind turbine blade 108. The controller 44 receives data representing the position and orientation of the holonomic-motion crawler vehicle from a crawler position detection system 84 and additional data from sensor(s) 82. The sensor(s) 82 may, e.g., include an inclinometer that provides data representing the angle of inclination of the holonomic-motion crawler vehicle or respective sensors that provide data representing the loads on each wheel. The controller 44 processes that information to: (1) control the stepper motors 8 as a function of the position/orientation data and (2) control the suction devices 10 as a function of the sensor data as disclosed in U.S. Pat. No. 8,738,226.

Figure 12:
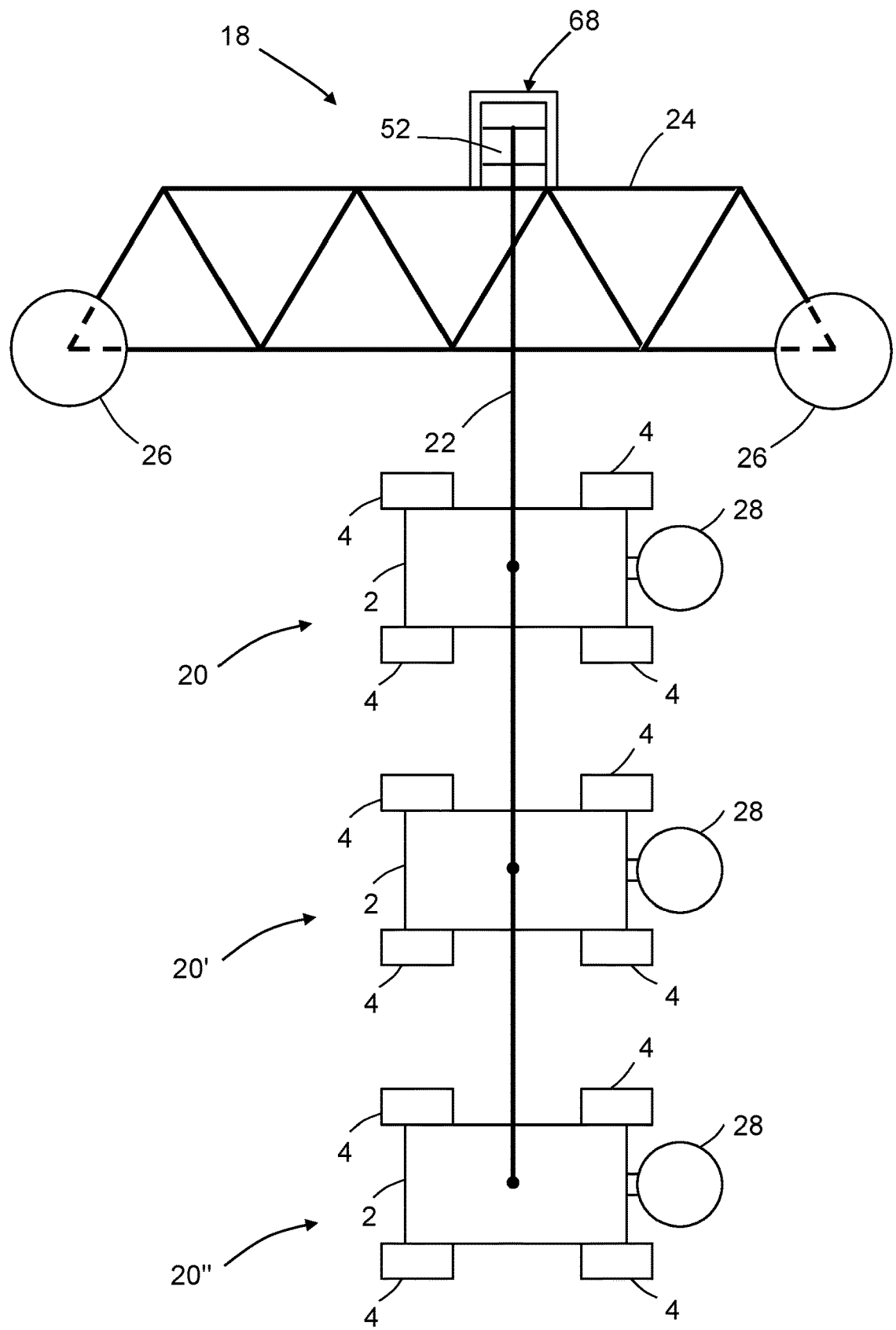
FIG. 12 is a diagram representing a view of an automated apparatus comprising a cart and a multiplicity of crawler vehicles connected to the cart by the same cable in accordance with another embodiment.

FIG. 12 is a diagram representing a view of an automated apparatus comprising a cart 18 and a multiplicity of crawler vehicles 20, 20' and 20" connected to the cart 18 by the same cable 22 in accordance with another embodiment. One or more of such a multi-vehicle cable may depend from the cart 18 on both side surfaces 114 and 116 of the wind turbine blade 108 seen in FIG. 2. For one example, in accordance with one possible scanning pattern: (a) while the cart 18 is stopped, the multiplicity of crawler vehicles 20, 20' and 20" may be suspended at a first set of elevations (i.e., distances from the cart 18); (b) while the crawler vehicles 20, 20' and 20" are so suspended, the cart 18 is moved from a first spanwise position along the leading edge 110 of the wind turbine blade 108 to a second spanwise position; (c) while the cart 18 is moving from the first spanwise position to the second spanwise position, the crawler vehicles 20, 20' and 20" suspended at the first set of elevations perform respective maintenance operations (e.g., acquiring NDI sensor data) along respective scan paths; (d) then the cart 18 is stopped and the crawler vehicles 20, 20' and 20" are respectively raised or lowered by unwinding or winding of the cable 22 to a second set of elevations different than the first set of elevations; and (e) while the cart 18 is moving from the second spanwise position to the first spanwise position, the crawler vehicles 20 suspended at the second set of elevations perform respective maintenance operations along respective scan paths.

Optionally, each crawler vehicle may be clamped to the cable 22 at a respective elevation by means of an electrically controllable cable clamping device, such as a solenoid-actuated clamp. After a maintenance operation has been completed, the crawler vehicles 20, 20' and 20" deployed in FIG. 12 may be stowed by being raised to respective park positions in the vicinity of the cart 18. More specifically, the cable 22 may be wound on the cable spool 52 until the crawler vehicle 20 is in proximity to the cart frame 24. While suction forces maintain the crawler vehicle 20 in that parked position, the cable clamping device on crawler vehicle 20 may be de-activated to enable the cable 22 to slide through the clamp on crawler vehicle 20 as the cable 22 continues to pull up the crawler vehicles 20' and 20". The cable 22 may continue to be wound on the cable spool 52 until the crawler vehicle 20' is in proximity to the parked crawler vehicle 20. While suction forces maintain the crawler vehicle 20' in that position, the cable clamping device on crawler vehicle 20' may be de-activated to enable the cable 22 to slide through the clamp on the crawler vehicle 20' as the cable 22 continues to pull up the crawler vehicle 20". The cable 22 then continues to be wound on the cable spool 52 until the crawler vehicle 20" is in proximity to the parked crawler vehicle 20'. The lowest crawler vehicle at the distal end of the cable 22 does not require a cable clamping device. The crawler vehicles 20, 20' and 20" may be deployed at different elevations using the reverse process.

The automated apparatus disclosed herein can be adapted for use in the automation of various maintenance functions, including but not limited to non-destructive inspection, drilling, grinding, fastening, applique application, scarfing, ply mapping, marking, cleaning and painting. In cases where the end effector is a rotary tool (such as a scarfer, drill, deburrer or reamer), when the rotary tool reaches a target position, the computer system can be programmed to activate the end effector motor (not shown in drawings) via a motor controller to drive rotation of the rotary tool.

While automated apparatuses have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. An automated apparatus comprising:
a cart comprising a cart frame, a multiplicity of wheels rotatably coupled to the cart frame, and a cart motor for driving rotation of a wheel of the multiplicity of wheels;
a multiplicity of cables depending from the cart;
a multiplicity of crawler vehicles respectively attached to the multiplicity of cables, each crawler vehicle comprising a crawler vehicle frame and a set of wheels rotatably coupled to the crawler vehicle frame; and
a multiplicity of maintenance tools respectively coupled to the crawler vehicle frames of the multiplicity of crawler vehicles,
wherein the multiplicity of crawler vehicles includes one subset of crawler vehicles connected to cables in positions where maintenance operations may be performed on one side surface of a wind turbine blade and another subset of crawler vehicles connected to cables in positions where maintenance operations may be performed on another side surface of the wind turbine blade when the cart is supported on an edge of the wind turbine blade.

2. The automated apparatus as recited in claim 1, further comprising:
a multiplicity of cable spools to which the multiplicity of cables are respectively attached; and
a multiplicity of spool motors configured to respectively drive rotation of the multiplicity of cable spools.

3. The automated apparatus as recited in claim 2, wherein the multiplicity of cable spools are rotatably coupled to the cart frame.

4. The automated apparatus as recited in claim 2, further comprising a multiplicity of turrets respectively mounted to the crawler vehicle frames of the multiplicity of crawler vehicles and having respective rotatable portions, wherein the multiplicity of cable spools are respectively rotatably coupled to the respective rotatable portions of the multiplicity of turrets for enabling the multiplicity of cables to respectively twist during rotation of the respective rotatable portions of the multiplicity of turrets.

5. The automated apparatus as recited in claim 4, further comprising:
a multiplicity of cords extending between the cart and the multiplicity of crawler vehicles and providing electrical power and control signals from the cart to the crawler vehicles during operation; and
a multiplicity of cord counter-reels respectively rotatably coupled to the respective rotatable portions of the multiplicity of turrets and respectively configured to compensate for cord twisting during rotation of the multiplicity of cable spools.

6. The automated apparatus as recited in claim 1, wherein the wheels of the crawler vehicles are configured to be capable of holonomic motion and the crawler vehicles further comprise:
a respective set of motors configured to respectively drive rotation of the wheels of the respective set of wheels; and
a respective multiplicity of controllers configured to respectively control the respective set of motors to cause the respective sets of wheels to produce holonomic motion of the crawler vehicles.

7. The automated apparatus as recited in claim 1, further comprising:
a multiplicity of cable spools to which the multiplicity of cables are respectively attached; and
a multiplicity of tensioning springs configured for respectively urging the multiplicity of cable spools to rotate in a direction that causes respective winding of the multiplicity of cables on the multiplicity of cable spools.

8. The automated apparatus as recited in claim 1, wherein the multiplicity of maintenance tools comprise non-destructive inspection probes.

9. The automated apparatus as recited in claim 1, further comprising a multiplicity of carriages respectively translatably coupled to the crawler vehicle frames, where the multiplicity of maintenance tools are respectively mounted to the multiplicity of carriages.

10. An automated apparatus comprising:
a cart comprising a cart frame, a first set of wheels rotatably coupled to the cart frame, and a cart motor for driving rotation of a wheel of the multiplicity of wheels;
a pair of cables depending from the cart;
a crawler vehicle attached to the cables and comprising a crawler vehicle frame and a second set of wheels rotatably coupled to the crawler vehicle frame; and
a maintenance tool coupled to the crawler vehicle frame, wherein the crawler vehicle further comprises:
a turret mounted to the crawler vehicle frame and having a rotatable portion; and
a cable spool rotatably coupled to the rotatable portion of the turret.

11. The automated apparatus as recited in claim 10, wherein the crawler vehicle further comprises a counter-reel rotatably coupled to the rotatable portion of the turret and configured to compensate for cord twisting during rotation of the cable spool.

12. The automated apparatus as recited in claim 10, wherein the wheels of the second set of wheels are configured to be capable of holonomic motion, and the crawler vehicle further comprises:
- a multiplicity of motors configured to respectively drive rotation of the second set of wheels; and
- a controller configured to control the set of motors to cause the second set of wheels to produce holonomic motion of the crawler vehicle.

13. The automated apparatus as recited in claim 10, wherein the crawler vehicle further comprises a tensioning spring configured for urging the cable spool to rotate in a cable winding direction.

14. The automated apparatus as recited in claim 10, wherein the crawler vehicle further comprises a spool motor configured for driving rotation of the cable spool.

15. The automated apparatus as recited in claim 10, wherein the crawler vehicle frame comprises an opening and a bottom surface that partly defines a suction zone, and the crawler vehicle further comprises a suction device mounted adjacent to the opening for producing suction force in the suction zone when the second set of wheels are in contact with a surface.

16. The automated apparatus as recited in claim 10, wherein the maintenance tool comprises a non-destructive inspection probe.

17. An automated system for performing a maintenance operation, comprising:
- a cart comprising a cart frame, a multiplicity of wheels rotatably coupled to the cart frame, and a cart motor for driving rotation of a wheel of the multiplicity of wheels;
- a multiplicity of cables depending from the cart;
- a multiplicity of cable spools to which the multiplicity of cables are respectively attached;
- a multiplicity of holonomic-motion crawler vehicles respectively attached to the multiplicity of cables, each holonomic-motion crawler vehicle comprising a crawler vehicle frame, a set of wheels rotatably coupled to the crawler vehicle frame, and a set of wheel motors configured to respectively drive rotation of the wheels of the set of wheels;
- a multiplicity of maintenance tools respectively coupled to the crawler vehicle frames of the multiplicity of crawler vehicles; and
- a computer system configured to control operation of the cart motor, wheel motors and maintenance tools to perform coordinated maintenance operations in respective areas of a surface over which the multiplicity of holonomic-motion crawler vehicles respectively travel.

18. The automated apparatus as recited in claim 17, wherein the maintenance tools are non-destructive inspection probes.

19. An automated apparatus comprising:
- a cart comprising a cart frame, a multiplicity of wheels rotatably coupled to the cart frame, and a cart motor for driving rotation of a wheel of the multiplicity of wheels;
- a multiplicity of cables depending from the cart;
- a multiplicity of crawler vehicles respectively attached to the multiplicity of cables, each crawler vehicle comprising a crawler vehicle frame and a set of wheels rotatably coupled to the crawler vehicle frame; and
- a multiplicity of maintenance tools respectively coupled to the crawler vehicle frames of the multiplicity of crawler vehicles,
wherein the crawler vehicle frames comprise a respective multiplicity of openings, a respective multiplicity of bottom surfaces that partly define a respective multiplicity of suction zones, and the multiplicity of crawler vehicles further comprise a respective multiplicity of suction devices respectively mounted adjacent to the multiplicity of openings for producing respective suction forces in the multiplicity of suction zones when the wheels of the crawler vehicle are in contact with a surface, and a respective multiplicity of low-surface-friction flexible skirts which are attached to the crawler vehicle frame to form boundary walls which partly define the suction zones.

20. The automated apparatus as recited in claim 17, further comprising a multiplicity of turrets respectively mounted to the crawler vehicle frames of the multiplicity of holonomic-motion crawler vehicles and having respective rotatable portions, wherein the multiplicity of cable spools are respectively rotatably coupled to the respective rotatable portions of the multiplicity of turrets for enabling the multiplicity of cables to respectively twist during rotation of the respective rotatable portions of the multiplicity of turrets.

\* \* \* \* \*